US012687916B2

(12) United States Patent
Ma et al.

(10) Patent No.: US 12,687,916 B2
(45) Date of Patent: Jul. 21, 2026

(54) PROTOCOL STATE AWARE POWER MANAGEMENT

(71) Applicant: Intel Corporation, Santa Clara, CA (US)

(72) Inventors: Liang Ma, Shannon (IE); Ping Yu, Shanghai (CN); Fan Zhang, Limerick (IE); Weigang Li, Shanghai (CN); Xin Zeng, Shanghai (CN); Xiao Long Ye, Shanghai (CN)

(73) Assignee: Intel Corporation, Santa Clara, CA (US)

( * ) Notice: Subject to any disclaimer, the term of this patent is extended or adjusted under 35 U.S.C. 154(b) by 286 days.

(21) Appl. No.: 18/038,660

(22) PCT Filed: Dec. 24, 2020

(86) PCT No.: PCT/CN2020/138904
§ 371 (c)(1),
(2) Date: May 24, 2023

(87) PCT Pub. No.: WO2022/133875
PCT Pub. Date: Jun. 30, 2022

(65) Prior Publication Data
US 2024/0036631 A1       Feb. 1, 2024

(51) Int. Cl.
*G06F 1/32*        (2019.01)
*G06F 1/3296*      (2019.01)
(Continued)

(52) U.S. Cl.
CPC ........ *G06F 1/3296* (2013.01); *H04L 63/0428* (2013.01); *H04W 76/10* (2018.02); *H04W 76/30* (2018.02)

(58) Field of Classification Search
CPC ................................... G06F 1/46; G06F 1/203
(Continued)

(56) References Cited

U.S. PATENT DOCUMENTS 6,347,091 B1    2/2002  Wallentin et al.
9,946,571 B1 *  4/2018  Brown ................. G06F 9/4893
(Continued)

FOREIGN PATENT DOCUMENTS

CN        110380825 A    10/2019
CN        110839271 A     2/2020
WO    WO-2022133875 A1    6/2022

OTHER PUBLICATIONS

"International Application Serial No. PCT/CN2020/138904, International Search Report mailed Sep. 24, 2021", 3 pgs.
(Continued)

*Primary Examiner* — Jaweed A Abbaszadeh
*Assistant Examiner* — Cheri L Harrington
(74) *Attorney, Agent, or Firm* — Schwegman Lundberg & Woessner, P.A.

(57)                ABSTRACT

Various systems and methods for implementing protocol state aware power management are described herein. A network interface device for implementing protocol state aware power management includes circuitry to provide a direct memory access interface; medium access control (MAC) circuitry to interface with a network; and control circuitry to: classify packets received at the MAC circuitry as packets used to open network connections or packets used to close network connections; maintain statistics of packets used to open network connections and packets used to close network connections; calculate a power hint based on the statistics of packets used to open connections and packets used to close network connections; and write a receive descriptor to a host memory using the direct memory access interface, the receive descriptor including a power hint field with the power hint, the power hint used by a host processor to scale processor power based on the power hint.

24 Claims, 10 Drawing Sheets

(51) Int. Cl.
    *H04L 9/40*           (2022.01)
    *H04W 76/10*        (2018.01)
    *H04W 76/30*        (2018.01)

(58) Field of Classification Search
    USPC ................................................. 713/300, 320
    See application file for complete search history.

(56)           References Cited

U.S. PATENT DOCUMENTS

| | | | | |
|---|---|---|---|---|
| 11,991,210 | B2 * | 5/2024 | Karin | G06N 20/00 |
| 12,238,386 | B2 * | 2/2025 | Hering | H04N 21/64723 |
| 2008/0232250 | A1 | 9/2008 | Park | |
| 2008/0307240 | A1 * | 12/2008 | Dahan | G06F 1/324 |
| | | | | 713/320 |
| 2009/0157936 | A1 * | 6/2009 | Goss | G06F 21/74 |
| | | | | 713/300 |
| 2010/0002610 | A1 * | 1/2010 | Bowser | G06F 1/3209 |
| | | | | 713/323 |
| 2010/0061245 | A1 * | 3/2010 | Larsen | H04L 47/2483 |
| | | | | 370/237 |
| 2010/0131781 | A1 * | 5/2010 | Memon | H04L 47/12 |
| | | | | 709/224 |
| 2010/0153590 | A1 * | 6/2010 | Hsin | G06F 1/3278 |
| | | | | 710/22 |
| 2010/0325463 | A1 * | 12/2010 | Lindsay | G06F 1/325 |
| | | | | 710/314 |
| 2011/0227634 | A1 * | 9/2011 | Kawasaki | G05F 1/56 |
| | | | | 327/540 |
| 2012/0076011 | A1 * | 3/2012 | Gobriel | H04W 52/0258 |
| | | | | 370/252 |
| 2013/0346766 | A1 * | 12/2013 | Tani | G06F 1/3206 |
| | | | | 713/300 |
| 2014/0032955 | A1 * | 1/2014 | Boelter | G06F 1/3206 |
| | | | | 713/323 |
| 2017/0374098 | A1 | 12/2017 | Kish et al. | |
| 2018/0131593 | A1 * | 5/2018 | Jain | H04L 43/18 |
| 2018/0131620 | A1 * | 5/2018 | Su | H04L 47/2441 |
| 2018/0263007 | A1 | 9/2018 | Poorrezaei | |
| 2019/0042310 | A1 * | 2/2019 | Browne | H04L 47/24 |
| 2023/0412893 | A1 * | 12/2023 | Hering | H04N 21/64723 |

OTHER PUBLICATIONS

"International Application Serial No. PCT/CN2020/138904, Written Opinion mailed Sep. 24, 2021", 4 pgs.

\* cited by examiner

PROTOCOL STATE AWARE POWER MANAGEMENT

PRIORITY APPLICATION

This application is a U.S. National Stage Application under 35 U.S.C. 371 from International Application No. PCT/CN2020/138904, now published as WO 2022/133875, filed 24 Dec. 2020, which is incorporated herein by reference in its entirety.

TECHNICAL FIELD

Embodiments described herein generally relate to network interface and power control circuitry and in particular, to a system that provides protocol state aware power management.

BACKGROUND

Edge computing, at a general level, refers to the transition of compute and storage resources closer to endpoint devices (e.g., consumer computing devices, user equipment, etc.) in order to optimize total cost of ownership, reduce application latency, improve service capabilities, and improve compliance with security or data privacy requirements. Edge computing may, in some scenarios, provide a cloud-like distributed service that offers orchestration and management for applications among many types of storage and compute resources. As a result, some implementations of edge computing have been referred to as the "edge cloud" or the "fog", as powerful computing resources previously available only in large remote data centers are moved closer to endpoints and made available for use by consumers at the "edge" of the network.

Edge computing use cases in mobile network settings have been developed for integration with multi-access edge computing (MEC) approaches, also known as "mobile edge computing." MEC approaches are designed to allow application developers and content providers to access computing capabilities and an information technology (IT) service environment in dynamic mobile network settings at the edge of the network. Limited standards have been developed by the European Telecommunications Standards Institute (ETSI) industry specification group (ISG) in an attempt to define common interfaces for operation of MEC systems, platforms, hosts, services, and applications.

Edge computing, MEC, and related technologies attempt to provide reduced latency, increased responsiveness, and more available computing power than offered in traditional cloud network services and wide area network connections. However, the integration of mobility and dynamically launched services to some mobile use and device processing use cases has led to limitations and concerns with orchestration, functional coordination, and resource management, especially in complex mobility settings where many participants (devices, hosts, tenants, service providers, operators) are involved. In a similar manner, Internet of Things (IoT) networks and devices are designed to offer a distributed compute arrangement, from a variety of endpoints. IoT devices are physical or virtualized objects that may communicate on a network, and may include sensors, actuators, and other input/output components, which may be used to collect data or perform actions in a real world environment. For example, IoT devices may include low-powered endpoint devices that are embedded or attached to everyday things, such as buildings, vehicles, packages, etc., to provide an additional level of artificial sensory perception of those things. Recently, IoT devices have become more popular and thus applications using these devices have proliferated.

The deployment of various Edge, Fog, MEC, and IoT networks, devices, and services have introduced a number of advanced use cases and scenarios occurring at and towards the edge of the network. However, these advanced use cases have also introduced a number of corresponding technical challenges relating to security, processing and network resources, service availability and efficiency, among many other issues, especially as more types of computing systems and configurations are deployed. One such challenge is in relation to security and trust, and the operational states of software programs and data, as represented in memory (e.g., DRAM memory), cache memory (e.g., in a cache), or registers (e.g., CPU, or GPU).

BRIEF DESCRIPTION OF THE DRAWINGS

In the drawings, which are not necessarily drawn to scale, like numerals may describe similar components in different views. Like numerals having different letter suffixes may represent different instances of similar components. Some embodiments are illustrated by way of example, and not limitation, in the figures of the accompanying drawings in which.

DETAILED DESCRIPTION

Systems and methods described herein provide a system capable of protocol state aware power management. In particular, the system adaptively adjusts the power supplied to a processor based on anticipated network activity.

Processor architecture power features are key to network function virtualization (NFV) networking workloads as they allow the applications to reduce power during low network loads and allow the processor to increase frequency to match demand during high demand periods. This provides customers with operating expense savings. The technology applies to 5G, Edge, NFV, software-defined networking (SDN) workloads, massive connection number and ultra-low latency demand extremely effective busyness detection technology. Traffic tendency prediction is crucial to enhance power efficiency.

A fundamental issue of system busyness detection is how to detect the traffic tendency as early as possible. Conventional detections methods use processor activity to calculate system busyness. This may be implemented by analyzing branch hit/miss ratios or empty poll numbers. These methods work adequately for workloads that have arrived, but they cannot predict future tendency. Hence, the systems described here use traffic detection and tendency evaluation at the network interface card (NIC), also referred to as a network interface device (NID), which is capable of monitoring stateful protocol traffic trends as soon as a packet arrives.

Previous implementations that use processor statistics only reflect workload that has arrived and begun processing. Artificial intelligence (AI) or deep learning algorithms that sample multiple system metrics to inference the current system busyness cannot precisely predict the traffic tendency, especially in a burst scenario. What is needed is a system that provides faster and more accurate evaluations and predictions of traffic tendency.

Stateful network protocol is used almost everywhere. Protocol state changes indicate the different performance or power demand. Current packet processing hardware or software solutions do not utilize the correlation between networking protocol state changes with performance or power demand. The systems and methods described here address these problems and provides a solution to transform protocol state information to hints for processor power management.

There are many advantages to the system described here. Placing the detection logic into a NIC can significantly reduce the detection latency, because the detection logic is very close to the packet classification unit. There is a graceful interval between protocol state changes and actual traffic change; consequently, the system has enough time to react to changes. Further, there is no need to have one core dedicated to network packets processing when the traffic is low.

Figure 1:
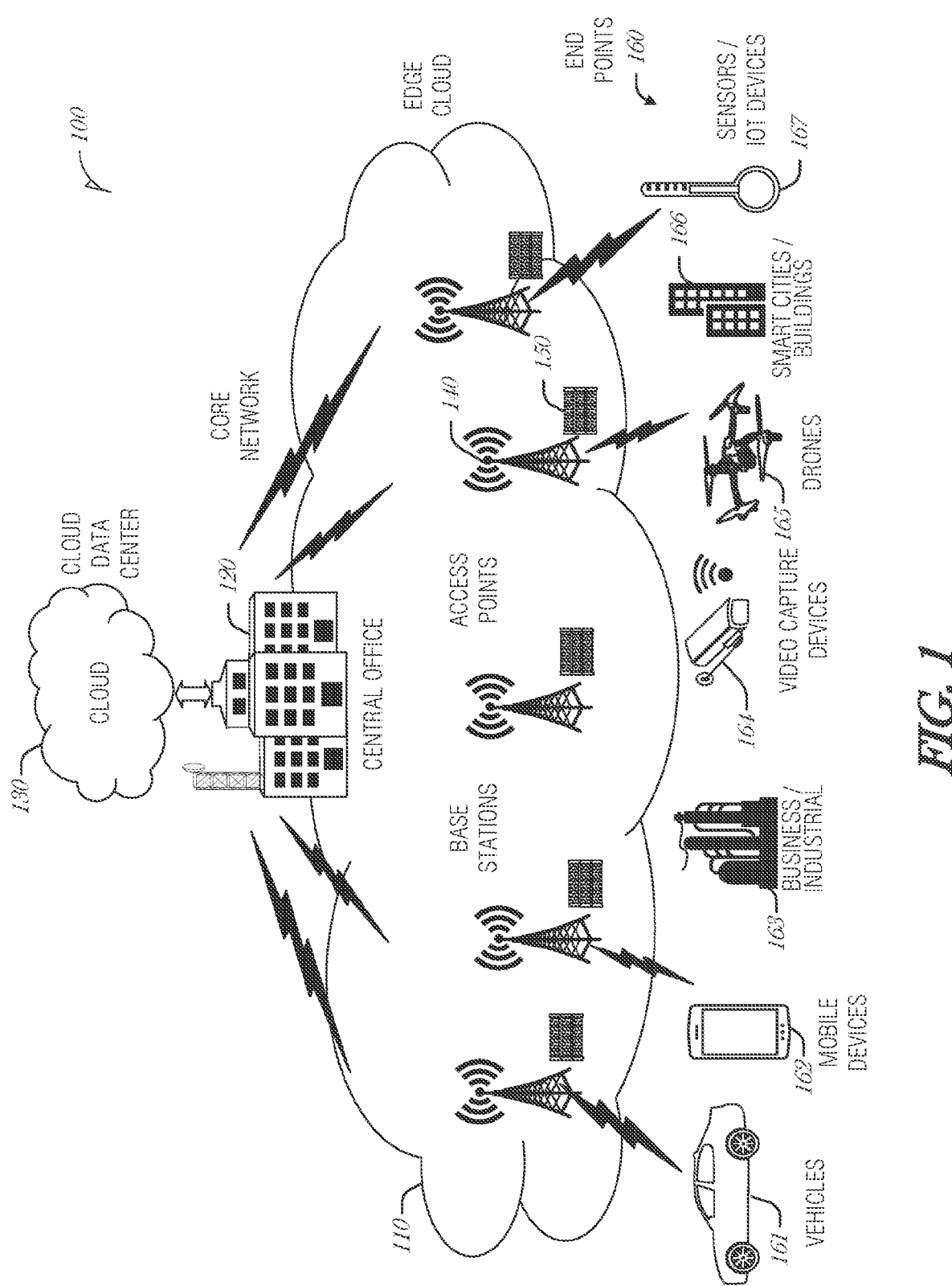
FIG. 1 illustrates an overview of an edge cloud configuration for edge computing.

FIG. 1 is a block diagram 100 showing an overview of a configuration for edge computing, which includes a layer of processing referred to in many of the following examples as an "edge cloud". As shown, the edge cloud 110 is co-located at an edge location, such as an access point or base station 140, a local processing hub 150, or a central office 120, and thus may include multiple entities, devices, and equipment instances. The edge cloud 110 is located much closer to the endpoint (consumer and producer) data sources 160 (e.g., autonomous vehicles 161, user equipment 162, business and industrial equipment 163, video capture devices 164, drones 165, smart cities and building devices 166, sensors and IoT devices 167, etc.) than the cloud data center 130. Compute, memory, and storage resources which are offered at the edges in the edge cloud 110 are critical to providing ultra-low latency response times for services and functions used by the endpoint data sources 160 as well as reduce network backhaul traffic from the edge cloud 110 toward cloud data center 130 thus improving energy consumption and overall network usages among other benefits.

Compute, memory, and storage are scarce resources, and generally decrease depending on the edge location (e.g., fewer processing resources being available at consumer endpoint devices, than at a base station, than at a central office). However, the closer that the edge location is to the endpoint (e.g., user equipment (UE)), the more that space and power is often constrained. Thus, edge computing attempts to reduce the amount of resources needed for network services, through the distribution of more resources which are located closer both geographically and in network access time. In this manner, edge computing attempts to bring the compute resources to the workload data where appropriate, or, bring the workload data to the compute resources.

The following describes aspects of an edge cloud architecture that covers multiple potential deployments and addresses restrictions that some network operators or service providers may have in their own infrastructures. These include, variation of configurations based on the edge location (because edges at a base station level, for instance, may have more constrained performance and capabilities in a multi-tenant scenario); configurations based on the type of compute, memory, storage, fabric, acceleration, or like resources available to edge locations, tiers of locations, or groups of locations; the service, security, and management and orchestration capabilities; and related objectives to achieve usability and performance of end services. These deployments may accomplish processing in network layers that may be considered as "near edge", "close edge", "local edge", "middle edge", or "far edge" layers, depending on latency, distance, and timing characteristics.

Edge computing is a developing paradigm where computing is performed at or closer to the "edge" of a network, typically through the use of a compute platform (e.g., x86 or ARM compute hardware architecture) implemented at base stations, gateways, network routers, or other devices which are much closer to endpoint devices producing and consuming the data. For example, edge gateway servers may be equipped with pools of memory and storage resources to perform computation in real-time for low latency use-cases (e.g., autonomous driving or video surveillance) for connected client devices. Or as an example, base stations may be augmented with compute and acceleration resources to directly process service workloads for connected user equipment, without further communicating data via backhaul networks. Or as another example, central office network management hardware may be replaced with standardized compute hardware that performs virtualized network functions and offers compute resources for the execution of services and consumer functions for connected devices. Within edge computing networks, there may be scenarios in services which the compute resource will be "moved" to the data, as well as scenarios in which the data will be "moved" to the compute resource. Or as an example, base station compute, acceleration and network resources can provide services in order to scale to workload demands on an as needed basis by activating dormant capacity (subscription, capacity on demand) in order to manage corner cases, emergencies or to provide longevity for deployed resources over a significantly longer implemented lifecycle.

Figure 2:
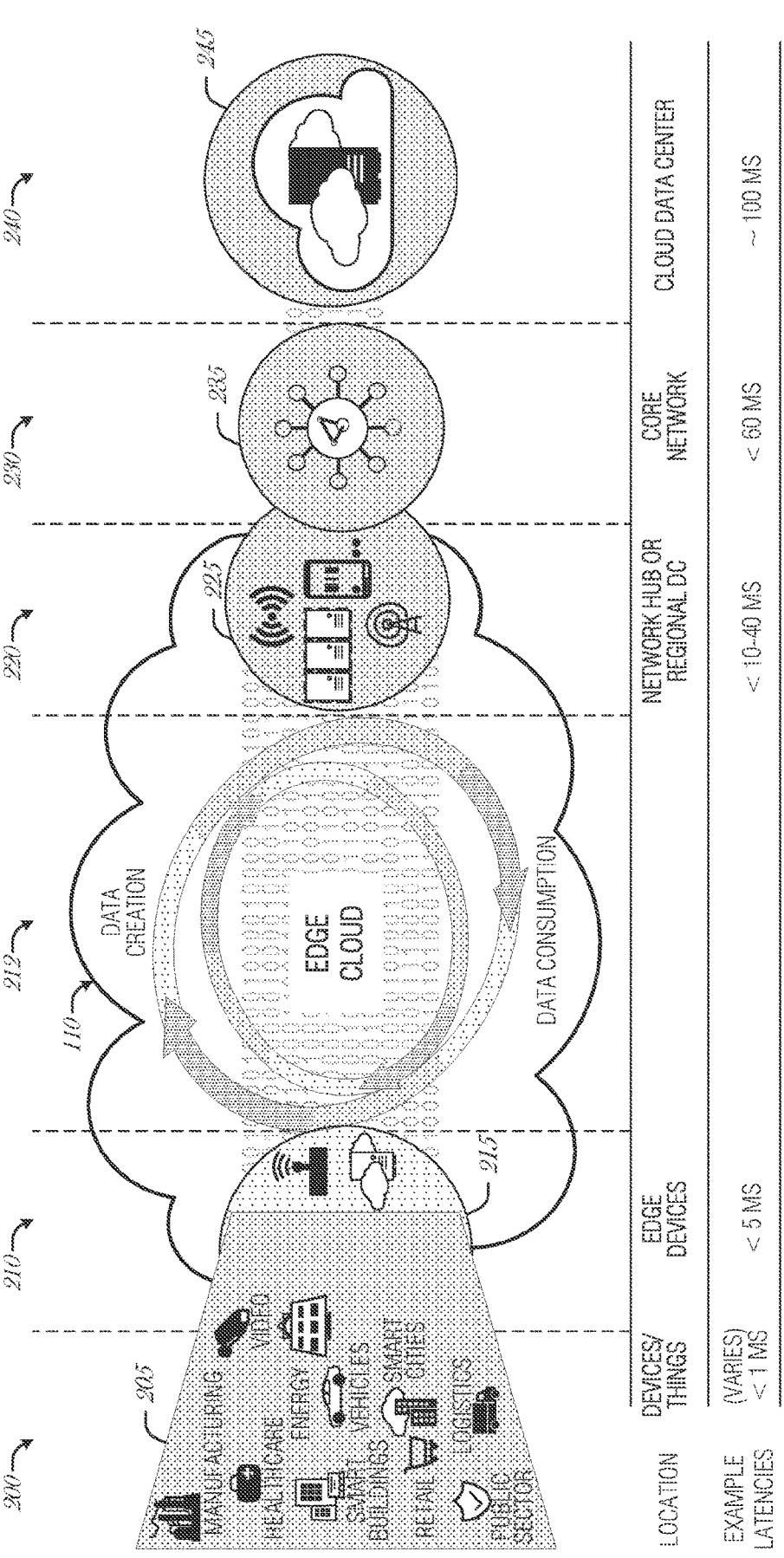
FIG. 2 illustrates operational layers among endpoints, an edge cloud, and cloud computing environments.

FIG. 2 illustrates operational layers among endpoints, an edge cloud, and cloud computing environments. Specifically, FIG. 2 depicts examples of computational use cases 205, utilizing the edge cloud 110 among multiple illustrative layers of network computing. The layers begin at an endpoint (devices and things) layer 200, which accesses the edge cloud 110 to conduct data creation, analysis, and data consumption activities. The edge cloud 110 may span multiple network layers, such as an edge devices layer 210 having gateways, on-premise servers, or network equipment (nodes 215) located in physically proximate edge systems; a network access layer 220, encompassing base stations, radio processing units, network hubs, regional data centers (DC), or local network equipment (equipment 225); and any equipment, devices, or nodes located therebetween (in layer 212, not illustrated in detail). The network communications within the edge cloud 110 and among the various layers may occur via any number of wired or wireless mediums, including via connectivity architectures and technologies not depicted.

Examples of latency, resulting from network communication distance and processing time constraints, may range from less than a millisecond (ms) when among the endpoint layer 200, under 5 ms at the edge devices layer 210, to even between 10 to 40 ms when communicating with nodes at the network access layer 220. Beyond the edge cloud 110 are core network 230 and cloud data center 240 layers, each with increasing latency (e.g., between 50-60 ms at the core network layer 230, to 100 or more ms at the cloud data center layer). As a result, operations at a core network data center 235 or a cloud data center 245, with latencies of at least 50 to 100 ms or more, will not be able to accomplish many time-critical functions of the use cases 205. Each of these latency values are provided for purposes of illustration and contrast; it will be understood that the use of other access network mediums and technologies may further reduce the latencies. In some examples, respective portions of the network may be categorized as "close edge", "local edge", "near edge", "middle edge", or "far edge" layers, relative to a network source and destination. For instance, from the perspective of the core network data center 235 or a cloud data center 245, a central office or content data network may be considered as being located within a "near edge" layer ("near" to the cloud, having high latency values when communicating with the devices and endpoints of the use cases 205), whereas an access point, base station, on-premise server, or network gateway may be considered as located within a "far edge" layer ("far" from the cloud, having low latency values when communicating with the devices and endpoints of the use cases 205). It will be understood that other categorizations of a particular network layer as constituting a "close", "local", "near", "middle", or "far" edge may be based on latency, distance, number of network hops, or other measurable characteristics, as measured from a source in any of the network layers 200-240.

The various use cases 205 may access resources under usage pressure from incoming streams, due to multiple services utilizing the edge cloud. To achieve results with low latency, the services executed within the edge cloud 110 balance varying requirements in terms of: (a) Priority (throughput or latency) and Quality of Service (QoS) (e.g., traffic for an autonomous car may have higher priority than a temperature sensor in terms of response time requirement; or, a performance sensitivity/bottleneck may exist at a compute/accelerator, memory, storage, or network resource, depending on the application); (b) Reliability and Resiliency (e.g., some input streams need to be acted upon and the traffic routed with mission-critical reliability, where as some other input streams may be tolerate an occasional failure, depending on the application); and (c) Physical constraints (e.g., power, cooling and form-factor).

The end-to-end service view for these use cases involves the concept of a service-flow and is associated with a transaction. The transaction details the overall service requirement for the entity consuming the service, as well as the associated services for the resources, workloads, workflows, and business functional and business level requirements. The services executed with the "terms" described may be managed at each layer in a way to assure real time, and runtime contractual compliance for the transaction during the lifecycle of the service. When a component in the transaction is missing its agreed to SLA, the system as a whole (components in the transaction) may provide the ability to (1) understand the impact of the SLA violation, and (2) augment other components in the system to resume overall transaction SLA, and (3) implement steps to remediate.

Thus, with these variations and service features in mind, edge computing within the edge cloud 110 may provide the ability to serve and respond to multiple applications of the use cases 205 (e.g., object tracking, video surveillance, connected cars, etc.) in real-time or near real-time, and meet ultra-low latency requirements for these multiple applications. These advantages enable a whole new class of applications (Virtual Network Functions (VNFs), Function as a Service (FaaS), Edge as a Service (EaaS), standard processes, etc.), which cannot leverage conventional cloud computing due to latency or other limitations.

However, with the advantages of edge computing comes the following caveats. The devices located at the edge are often resource constrained and therefore there is pressure on usage of edge resources. Typically, this is addressed through the pooling of memory and storage resources for use by multiple users (tenants) and devices. The edge may be power and cooling constrained and therefore the power usage needs to be accounted for by the applications that are consuming the most power. There may be inherent power-performance tradeoffs in these pooled memory resources, as many of them are likely to use emerging memory technologies, where more power requires greater memory bandwidth. Likewise, improved security of hardware and root of trust trusted functions are also required, because edge locations may be unmanned and may even need permissioned access (e.g., when housed in a third-party location). Such issues are magnified in the edge cloud 110 in a multi-tenant, multi-owner, or multi-access setting, where services and applications are requested by many users, especially as network usage dynamically fluctuates and the composition of the multiple stakeholders, use cases, and services changes.

At a more generic level, an edge computing system may be described to encompass any number of deployments at the previously discussed layers operating in the edge cloud 110 (network layers 200-240), which provide coordination from client and distributed computing devices. One or more edge gateway nodes, one or more edge aggregation nodes, and one or more core data centers may be distributed across layers of the network to provide an implementation of the edge computing system by or on behalf of a telecommunication service provider ("telco", or "TSP"), internet-of-things service provider, cloud service provider (CSP), enterprise entity, or any other number of entities. Various implementations and configurations of the edge computing system may be provided dynamically, such as when orchestrated to meet service objectives.

Consistent with the examples provided herein, a client compute node may be embodied as any type of endpoint component, device, appliance, or other thing capable of communicating as a producer or consumer of data. Further, the label "node" or "device" as used in the edge computing system does not necessarily mean that such node or device operates in a client or agent/minion/follower role; rather, any of the nodes or devices in the edge computing system refer to individual entities, nodes, or subsystems which include discrete or connected hardware or software configurations to facilitate or use the edge cloud 110.

As such, the edge cloud 110 is formed from network components and functional features operated by and within edge gateway nodes, edge aggregation nodes, or other edge compute nodes among network layers 210-230. The edge cloud 110 thus may be embodied as any type of network that provides edge computing and/or storage resources which are proximately located to radio access network (RAN) capable endpoint devices (e.g., mobile computing devices, IoT devices, smart devices, etc.), which are discussed herein. In other words, the edge cloud 110 may be envisioned as an "edge" which connects the endpoint devices and traditional network access points that serve as an ingress point into service provider core networks, including mobile carrier networks (e.g., Global System for Mobile Communications (GSM) networks, Long-Term Evolution (LTE) networks, 5G/6G networks, etc.), while also providing storage and/or compute capabilities. Other types and forms of network access (e.g., Wi-Fi, long-range wireless, wired networks including optical networks) may also be utilized in place of or in combination with such 3GPP carrier networks.

The network components of the edge cloud 110 may be servers, multi-tenant servers, appliance computing devices, and/or any other type of computing devices. For example, the edge cloud 110 may include an appliance computing device that is a self-contained electronic device including a housing, a chassis, a case or a shell. In some circumstances, the housing may be dimensioned for portability such that it can be carried by a human and/or shipped. Example housings may include materials that form one or more exterior surfaces that partially or fully protect contents of the appliance, in which protection may include weather protection, hazardous environment protection (e.g., EMI, vibration, extreme temperatures), and/or enable submergibility. Example housings may include power circuitry to provide power for stationary and/or portable implementations, such as AC power inputs, DC power inputs, AC/DC or DC/AC converter(s), power regulators, transformers, charging circuitry, batteries, wired inputs and/or wireless power inputs. Example housings and/or surfaces thereof may include or connect to mounting hardware to enable attachment to structures such as buildings, telecommunication structures (e.g., poles, antenna structures, etc.) and/or racks (e.g., server racks, blade mounts, etc.). Example housings and/or surfaces thereof may support one or more sensors (e.g., temperature sensors, vibration sensors, light sensors, acoustic sensors, capacitive sensors, proximity sensors, etc.). One or more such sensors may be contained in, carried by, or otherwise embedded in the surface and/or mounted to the surface of the appliance. Example housings and/or surfaces thereof may support mechanical connectivity, such as propulsion hardware (e.g., wheels, propellers, etc.) and/or articulating hardware (e.g., robot arms, pivotable appendages, etc.). In some circumstances, the sensors may include any type of input devices such as user interface hardware (e.g., buttons, switches, dials, sliders, etc.). In some circumstances, example housings include output devices contained in, carried by, embedded therein and/or attached thereto. Output devices may include displays, touchscreens, lights, LEDs, speakers, I/O ports (e.g., USB), etc. In some circumstances, edge devices are devices presented in the network for a specific purpose (e.g., a traffic light), but may have processing and/or other capacities that may be utilized for other purposes. Such edge devices may be independent from other networked devices and may be provided with a housing having a form factor suitable for its primary purpose; yet be available for other compute tasks that do not interfere with its primary task. Edge devices include Internet of Things devices. The appliance computing device may include hardware and software components to manage local issues such as device temperature, vibration, resource utilization, updates, power issues, physical and network security, etc. Example hardware for implementing an appliance computing device is described in conjunction with FIG. 4B. The edge cloud 110 may also include one or more servers and/or one or more multi-tenant servers. Such a server may include an operating system and implement a virtual computing environment. A virtual computing environment may include a hypervisor managing (e.g., spawning, deploying, destroying, etc.) one or more virtual machines, one or more containers, etc. Such virtual computing environments provide an execution environment in which one or more applications and/or other software, code or scripts may execute while being isolated from one or more other applications, software, code or scripts.

Figure 3:
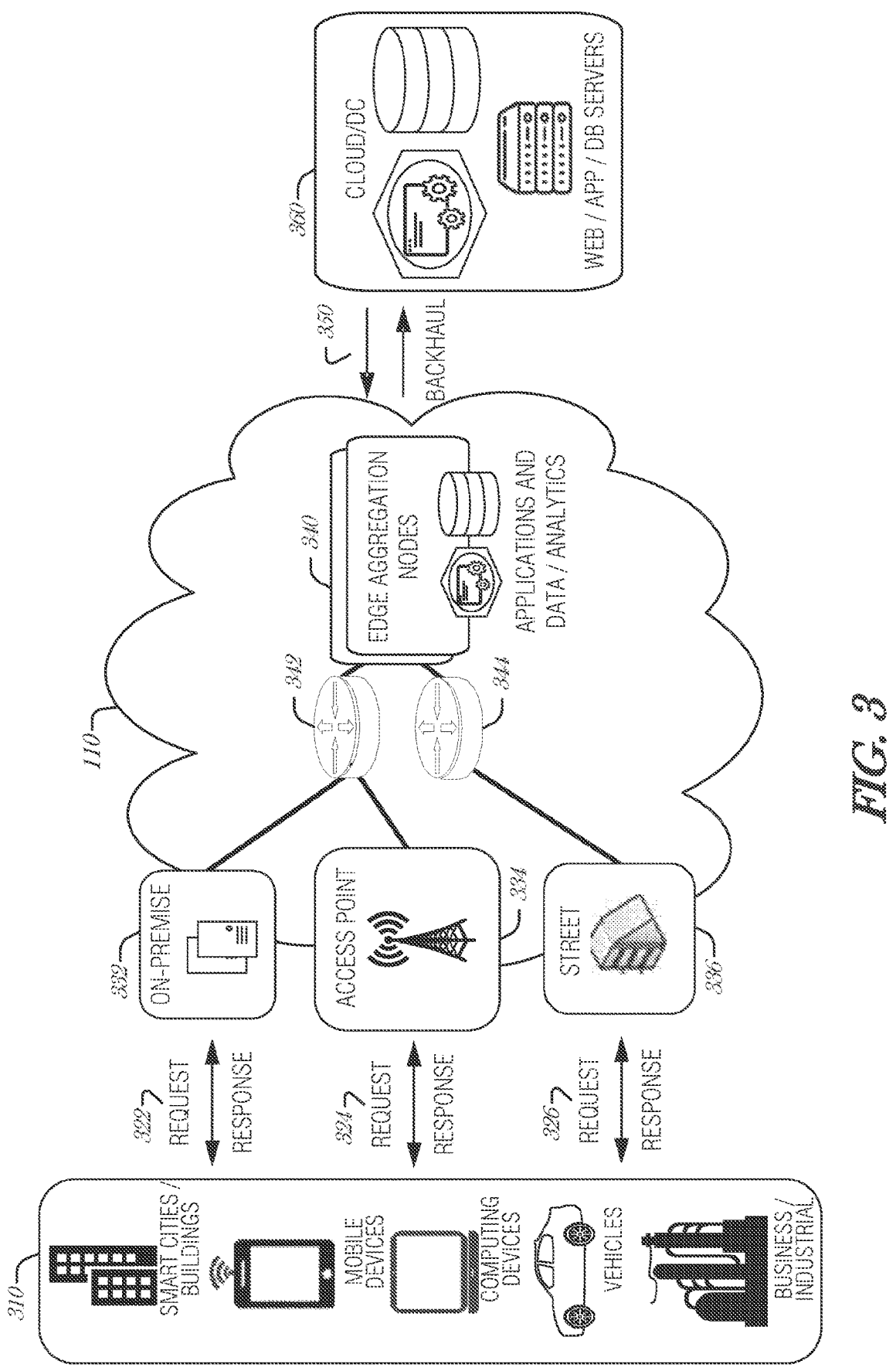
FIG. 3 illustrates an example approach for networking and services in an edge computing system.

In FIG. 3, various client endpoints 310 (in the form of mobile devices, computers, autonomous vehicles, business computing equipment, industrial processing equipment) exchange requests and responses that are specific to the type of endpoint network aggregation. For instance, client endpoints 310 may obtain network access via a wired broadband network, by exchanging requests and responses 322 through an on-premise network system 332. Some client endpoints 310, such as mobile computing devices, may obtain network access via a wireless broadband network, by exchanging requests and responses 324 through an access point (e.g., cellular network tower) 334. Some client endpoints 310, such as autonomous vehicles may obtain network access for requests and responses 326 via a wireless vehicular network through a street-located network system 336. However, regardless of the type of network access, the TSP may deploy aggregation points 342, 344 within the edge cloud 110 to aggregate traffic and requests. Thus, within the edge cloud 110, the TSP may deploy various compute and storage resources, such as at edge aggregation nodes 340, to provide requested content. The edge aggregation nodes 340 and other systems of the edge cloud 110 are connected to a cloud or data center 360, which uses a backhaul network 350 to fulfill higher-latency requests from a cloud/data center for websites, applications, database servers, etc. Additional or consolidated instances of the edge aggregation nodes 340 and the aggregation points 342, 344, including those deployed on a single server framework, may also be present within the edge cloud 110 or other areas of the TSP infrastructure.

In further examples, any of the compute nodes or devices discussed with reference to the present edge computing systems and environment may be fulfilled based on the components depicted in FIGS. 4A and 4B. Respective edge compute nodes may be embodied as a type of device, appliance, computer, or other "thing" capable of communicating with other edge, networking, or endpoint components. For example, an edge compute device may be embodied as a personal computer, server, smartphone, a mobile compute device, a smart appliance, an in-vehicle compute system (e.g., a navigation system), a self-contained device having an outer case, shell, etc., or other device or system capable of performing the described functions.

Figure 4A:
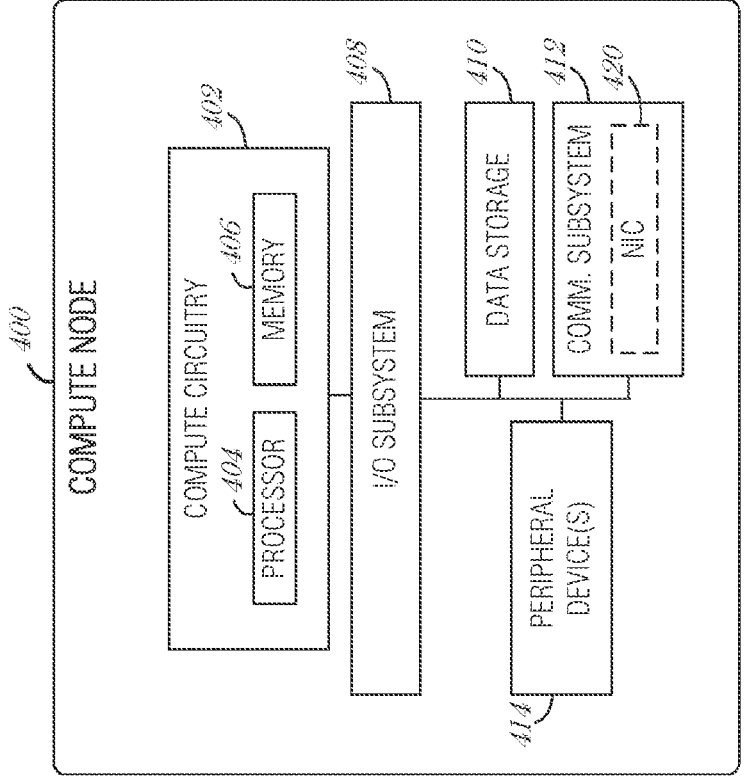
FIG. 4A provides an overview of example components for compute deployed at a compute node in an edge computing system.

In the simplified example depicted in FIG. 4A, an edge compute node 400 includes a compute engine (also referred to herein as "compute circuitry") 402, an input/output (I/O) subsystem 408, data storage 410, a communication circuitry subsystem 412, and, optionally, one or more peripheral devices 414. In other examples, respective compute devices may include other or additional components, such as those typically found in a computer (e.g., a display, peripheral devices, etc.). Additionally, in some examples, one or more of the illustrative components may be incorporated in, or otherwise form a portion of, another component.

The compute node 400 may be embodied as any type of engine, device, or collection of devices capable of performing various compute functions. In some examples, the compute node 400 may be embodied as a single device such as an integrated circuit, an embedded system, a field-programmable gate array (FPGA), a system-on-a-chip (SoC), or other integrated system or device. In the illustrative example, the compute node 400 includes or is embodied as a processor 404 and a memory 406. The processor 404 may be embodied as any type of processor capable of performing the functions described herein (e.g., executing an application). For example, the processor 404 may be embodied as a multi-core processor(s), a microcontroller, a processing unit, a specialized or special purpose processing unit, or other processor or processing/controlling circuit.

In some examples, the processor 404 may be embodied as, include, or be coupled to an FPGA, an application specific integrated circuit (ASIC), reconfigurable hardware or hardware circuitry, or other specialized hardware to facilitate performance of the functions described herein. Also, in some examples, the processor 404 may be embodied as a specialized x-processing unit (xPU) also known as a data processing unit (DPU), infrastructure processing unit (IPU), or network processing unit (NPU). Such an xPU may be embodied as a standalone circuit or circuit package, integrated within an SoC, or integrated with networking circuitry (e.g., in a SmartNIC, or enhanced SmartNIC), acceleration circuitry, storage devices, or AI hardware (e.g., GPUs or programmed FPGAs). Such an xPU may be designed to receive programming to process one or more data streams and perform specific tasks and actions for the data streams (such as hosting microservices, performing service management or orchestration, organizing or managing server or data center hardware, managing service meshes, or collecting and distributing telemetry), outside of the CPU or general purpose processing hardware. However, it will be understood that a xPU, a SoC, a CPU, and other variations of the processor 404 may work in coordination with each other to execute many types of operations and instructions within and on behalf of the compute node 400.

The memory 406 may be embodied as any type of volatile (e.g., dynamic random access memory (DRAM), etc.) or non-volatile memory or data storage capable of performing the functions described herein. Volatile memory may be a storage medium that requires power to maintain the state of data stored by the medium. Non-limiting examples of volatile memory may include various types of random access memory (RAM), such as DRAM or static random access memory (SRAM). One particular type of DRAM that may be used in a memory module is synchronous dynamic random access memory (SDRAM).

In an example, the memory device is a block addressable memory device, such as those based on NAND or NOR technologies. A memory device may also include a three dimensional crosspoint memory device (e.g., Intel® 3D XPoint™ memory), or other byte addressable write-in-place nonvolatile memory devices. The memory device may refer to the die itself and/or to a packaged memory product. In some examples, 3D crosspoint memory (e.g., Intel® 3D XPoint™ memory) may comprise a transistor-less stackable cross point architecture in which memory cells sit at the intersection of word lines and bit lines and are individually addressable and in which bit storage is based on a change in bulk resistance. In some examples, all or a portion of the memory 406 may be integrated into the processor 404. The memory 406 may store various software and data used during operation such as one or more applications, data operated on by the application(s), libraries, and drivers.

The compute circuitry 402 is communicatively coupled to other components of the compute node 400 via the I/O subsystem 408, which may be embodied as circuitry and/or components to facilitate input/output operations with the compute circuitry 402 (e.g., with the processor 404 and/or the main memory 406) and other components of the compute circuitry 402. For example, the I/O subsystem 408 may be embodied as, or otherwise include, memory controller hubs, input/output control hubs, integrated sensor hubs, firmware devices, communication links (e.g., point-to-point links, bus links, wires, cables, light guides, printed circuit board traces, etc.), and/or other components and subsystems to facilitate the input/output operations. In some examples, the I/O subsystem 408 may form a portion of a system-on-a-chip (SoC) and be incorporated, along with one or more of the processor 404, the memory 406, and other components of the compute circuitry 402, into the compute circuitry 402.

The one or more illustrative data storage devices 410 may be embodied as any type of devices configured for short-term or long-term storage of data such as, for example, memory devices and circuits, memory cards, hard disk drives, solid-state drives, or other data storage devices. Individual data storage devices 410 may include a system partition that stores data and firmware code for the data storage device 410. Individual data storage devices 410 may also include one or more operating system partitions that store data files and executables for operating systems depending on, for example, the type of compute node 400.

The communication circuitry 412 may be embodied as any communication circuit, device, or collection thereof, capable of enabling communications over a network between the compute circuitry 402 and another compute device (e.g., an edge gateway of an implementing edge computing system). The communication circuitry 412 may be configured to use any one or more communication technology (e.g., wired or wireless communications) and associated protocols (e.g., a cellular networking protocol such a 3GPP 4G or 5G standard, a wireless local area network protocol such as IEEE 802.11/Wi-Fi®, a wireless wide area network protocol, Ethernet, Bluetooth®, Bluetooth Low Energy, a IoT protocol such as IEEE 802.15.4 or ZigBee®, low-power wide-area network (LPWAN) or low-power wide-area (LPWA) protocols, etc.) to effect such communication.

The illustrative communication circuitry 412 includes a network interface controller (NIC) 420, which may also be referred to as a host fabric interface (HFI). The NIC 420 may be embodied as one or more add-in-boards, daughter cards, network interface cards, controller chips, chipsets, or other devices that may be used by the compute node 400 to connect with another compute device (e.g., an edge gateway node). In some examples, the NIC 420 may be embodied as part of a system-on-a-chip (SoC) that includes one or more processors, or included on a multichip package that also contains one or more processors. In some examples, the NIC 420 may include a local processor (not shown) and/or a local memory (not shown) that are both local to the NIC 420. In such examples, the local processor of the NIC 420 may be capable of performing one or more of the functions of the compute circuitry 402 described herein. Additionally, or alternatively, in such examples, the local memory of the NIC 420 may be integrated into one or more components of the client compute node at the board level, socket level, chip level, and/or other levels.

Additionally, in some examples, a respective compute node 400 may include one or more peripheral devices 414. Such peripheral devices 414 may include any type of peripheral device found in a compute device or server such as audio input devices, a display, other input/output devices, interface devices, and/or other peripheral devices, depending on the particular type of the compute node 400. In further examples, the compute node 400 may be embodied by a respective edge compute node (whether a client, gateway, or aggregation node) in an edge computing system or like forms of appliances, computers, subsystems, circuitry, or other components.

Figure 4B:
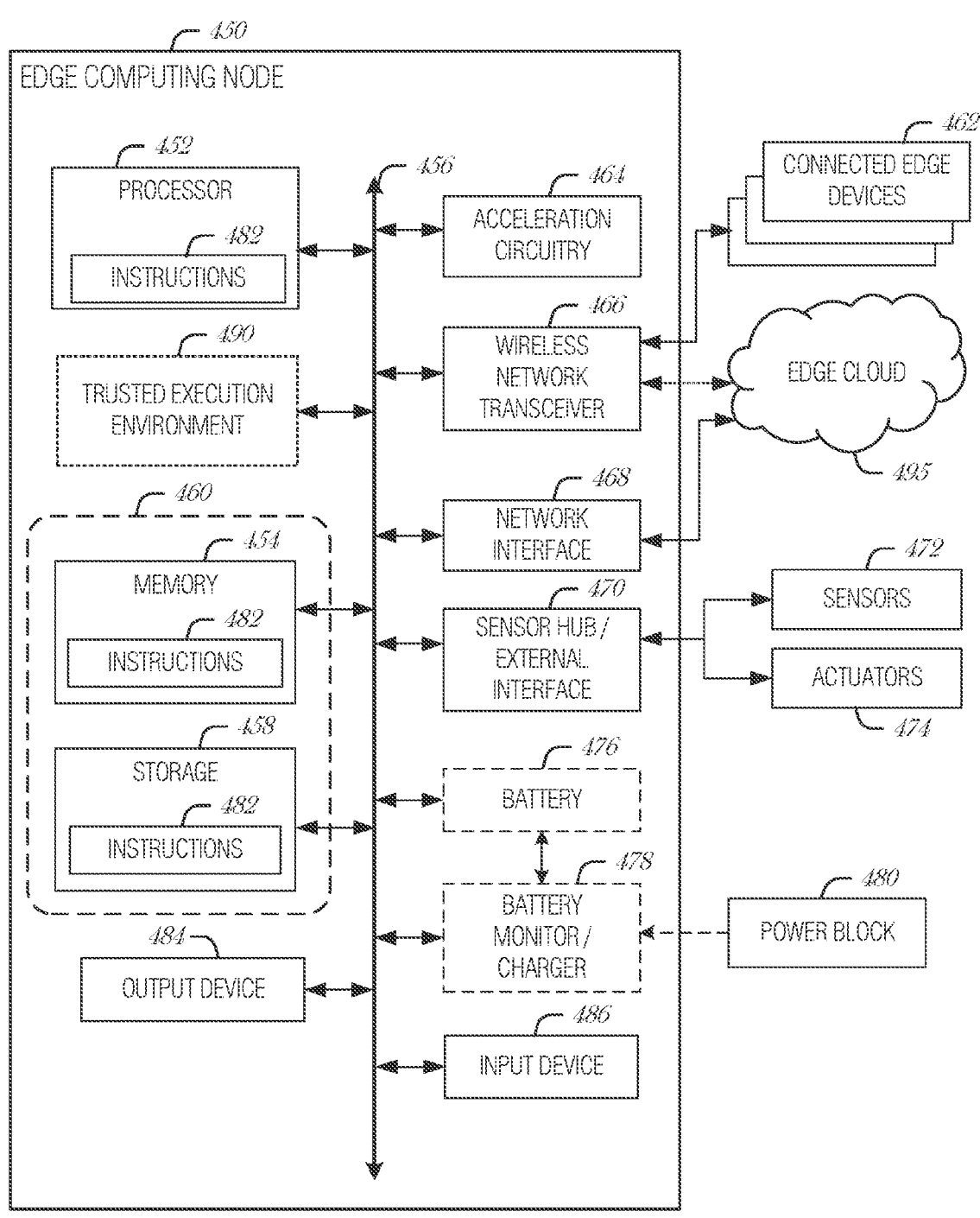
FIG. 4B provides a further overview of example components within a computing device in an edge computing system.

In a more detailed example, FIG. 4B illustrates a block diagram of an example of components that may be present in an edge computing node 450 for implementing the techniques (e.g., operations, processes, methods, and methodologies) described herein. This edge computing node 450 provides a closer view of the respective components of node 400 when implemented as or as part of a computing device (e.g., as a mobile device, a base station, server, gateway, etc.). The edge computing node 450 may include any combinations of the hardware or logical components referenced herein, and it may include or couple with any device usable with an edge communication network or a combination of such networks. The components may be implemented as integrated circuits (ICs), portions thereof, discrete electronic devices, or other modules, instruction sets, programmable logic or algorithms, hardware, hardware accelerators, software, firmware, or a combination thereof adapted in the edge computing node 450, or as components otherwise incorporated within a chassis of a larger system.

The edge computing node 450 may include processing circuitry in the form of a processor 452, which may be a microprocessor, a multi-core processor, a multithreaded processor, an ultra-low voltage processor, an embedded processor, an xPU/DPU/IPU/NPU, special purpose processing unit, specialized processing unit, or other known processing elements. The processor 452 may be a part of a system on a chip (SoC) in which the processor 452 and other components are formed into a single integrated circuit, or a single package, such as the Edison™ or Galileo™ SoC boards from Intel Corporation, Santa Clara, California. As an example, the processor 452 may include an Intel® Architecture Core™ based CPU processor, such as a Quark™, an Atom™, an i3, an i5, an i7, an i9, or an MCU-class processor, or another such processor available from Intel®. However, any number other processors may be used, such as available from Advanced Micro Devices, Inc. (AMD®) of Sunnyvale, California, a MIPS®-based design from MIPS Technologies, Inc. of Sunnyvale, California, an ARM®-based design licensed from ARM Holdings, Ltd. or a customer thereof, or their licensees or adopters. The processors may include units such as an A5-13 processor from Apple® Inc., a Snapdragon™ processor from Qualcomm® Technologies, Inc., or an OMAP™ processor from Texas Instruments, Inc. The processor 452 and accompanying circuitry may be provided in a single socket form factor, multiple socket form factor, or a variety of other formats, including in limited hardware configurations or configurations that include fewer than all elements shown in FIG. 4B.

The processor 452 may communicate with a system memory 454 over an interconnect 456 (e.g., a bus). Any number of memory devices may be used to provide for a given amount of system memory. As examples, the memory 454 may be random access memory (RAM) in accordance with a Joint Electron Devices Engineering Council (JEDEC) design such as the DDR or mobile DDR standards (e.g., LPDDR, LPDDR2, LPDDR3, or LPDDR4). In particular examples, a memory component may comply with a DRAM standard promulgated by JEDEC, such as JESD79F for DDR SDRAM, JESD79-2F for DDR2 SDRAM, JESD79-3F for DDR3 SDRAM, JESD79-4A for DDR4 SDRAM, JESD209 for Low Power DDR (LPDDR), JESD209-2 for LPDDR2, JESD209-3 for LPDDR3, and JESD209-4 for LPDDR4. Such standards (and similar standards) may be referred to as DDR-based standards and communication interfaces of the storage devices that implement such standards may be referred to as DDR-based interfaces. In various implementations, the individual memory devices may be of any number of different package types such as single die package (SDP), dual die package (DDP) or quad die package (Q17P). These devices, in some examples, may be directly soldered onto a motherboard to provide a lower profile solution, while in other examples the devices are configured as one or more memory modules that in turn couple to the motherboard by a given connector. Any number of other memory implementations may be used, such as other types of memory modules, e.g., dual inline memory modules (DIMMs) of different varieties including but not limited to microDIMMs or MiniDIMMs.

To provide for persistent storage of information such as data, applications, operating systems and so forth, a storage 458 may also couple to the processor 452 via the interconnect 456. In an example, the storage 458 may be implemented via a solid-state disk drive (SSDD). Other devices that may be used for the storage 458 include flash memory cards, such as Secure Digital (SD) cards, microSD cards, eXtreme Digital (XD) picture cards, and the like, and Universal Serial Bus (USB) flash drives. In an example, the memory device may be or may include memory devices that use chalcogenide glass, multi-threshold level NAND flash memory, NOR flash memory, single or multi-level Phase Change Memory (PCM), a resistive memory, nanowire memory, ferroelectric transistor random access memory (FeTRAM), anti-ferroelectric memory, magnetoresistive random access memory (MRAM) memory that incorporates memristor technology, resistive memory including the metal oxide base, the oxygen vacancy base and the conductive bridge Random Access Memory (CB-RAM), or spin transfer torque (STT)-MRAM, a spintronic magnetic junction memory based device, a magnetic tunneling junction (MTJ) based device, a DW (Domain Wall) and SOT (Spin Orbit Transfer) based device, a thyristor based memory device, or a combination of any of the above, or other memory.

In low power implementations, the storage 458 may be on-die memory or registers associated with the processor 452. However, in some examples, the storage 458 may be implemented using a micro hard disk drive (HDD). Further, any number of new technologies may be used for the storage 458 in addition to, or instead of, the technologies described, such resistance change memories, phase change memories, holographic memories, or chemical memories, among others.

The components may communicate over the interconnect 456. The interconnect 456 may include any number of technologies, including industry standard architecture (ISA), extended ISA (EISA), peripheral component interconnect (PCI), peripheral component interconnect extended (PCIx), PCI express (PCIe), or any number of other technologies. The interconnect 456 may be a proprietary bus, for example, used in an SoC based system. Other bus systems may be included, such as an Inter-Integrated Circuit (I2C) interface, a Serial Peripheral Interface (SPI) interface, point to point interfaces, and a power bus, among others.

The interconnect 456 may couple the processor 452 to a transceiver 466, for communications with the connected edge devices 462. The transceiver 466 may use any number of frequencies and protocols, such as 2.4 Gigahertz (GHz) transmissions under the IEEE 802.15.4 standard, using the Bluetooth® low energy (BLE) standard, as defined by the Bluetooth® Special Interest Group, or the ZigBee® standard, among others. Any number of radios, configured for a particular wireless communication protocol, may be used for the connections to the connected edge devices 462. For example, a wireless local area network (WLAN) unit may be used to implement Wi-Fi® communications in accordance with the Institute of Electrical and Electronics Engineers (IEEE) 802.11 standard. In addition, wireless wide area communications, e.g., according to a cellular or other wireless wide area protocol, may occur via a wireless wide area network (WWAN) unit.

The wireless network transceiver 466 (or multiple transceivers) may communicate using multiple standards or radios for communications at a different range. For example, the edge computing node 450 may communicate with close devices, e.g., within about 10 meters, using a local transceiver based on Bluetooth Low Energy (BLE), or another low power radio, to save power. More distant connected edge devices 462, e.g., within about 50 meters, may be reached over ZigBee® or other intermediate power radios. Both communications techniques may take place over a single radio at different power levels or may take place over separate transceivers, for example, a local transceiver using BLE and a separate mesh transceiver using ZigBee®.

A wireless network transceiver 466 (e.g., a radio transceiver) may be included to communicate with devices or services in a cloud (e.g., an edge cloud 495) via local or wide area network protocols. The wireless network transceiver 466 may be a low-power wide-area (LPWA) transceiver that follows the IEEE 802.15.4, or IEEE 802.15.4g standards, among others. The edge computing node 450 may communicate over a wide area using LoRaWAN™ (Long Range Wide Area Network) developed by Semtech and the LoRa Alliance. The techniques described herein are not limited to these technologies but may be used with any number of other cloud transceivers that implement long range, low bandwidth communications, such as Sigfox, and other technologies. Further, other communications techniques, such as time-slotted channel hopping, described in the IEEE 802.15.4e specification may be used.

Any number of other radio communications and protocols may be used in addition to the systems mentioned for the wireless network transceiver 466, as described herein. For example, the transceiver 466 may include a cellular transceiver that uses spread spectrum (SPA/SAS) communications for implementing high-speed communications. Further, any number of other protocols may be used, such as Wi-Fi® networks for medium speed communications and provision of network communications. The transceiver 466 may include radios that are compatible with any number of 3GPP (Third Generation Partnership Project) specifications, such as Long Term Evolution (LTE) and 5th Generation (5G) communication systems, discussed in further detail at the end of the present disclosure. A network interface controller (NIC) 468 may be included to provide a wired communication to nodes of the edge cloud 495 or to other devices, such as the connected edge devices 462 (e.g., operating in a mesh). The wired communication may provide an Ethernet connection or may be based on other types of networks, such as Controller Area Network (CAN), Local Interconnect Network (LIN), DeviceNet, ControlNet, Data Highway+, PROFIBUS, or PROFINET, among many others. An additional NIC 468 may be included to enable connecting to a second network, for example, a first NIC 468 providing communications to the cloud over Ethernet, and a second NIC 468 providing communications to other devices over another type of network.

Given the variety of types of applicable communications from the device to another component or network, applicable communications circuitry used by the device may include or be embodied by any one or more of components 464, 466, 468, or 470. Accordingly, in various examples, applicable means for communicating (e.g., receiving, transmitting, etc.) may be embodied by such communications circuitry.

The edge computing node 450 may include or be coupled to acceleration circuitry 464, which may be embodied by one or more artificial intelligence (AI) accelerators, a neural compute stick, neuromorphic hardware, an FPGA, an arrangement of GPUs, an arrangement of xPUs/DPUs/IPU/NPUs, one or more SoCs, one or more CPUs, one or more digital signal processors, dedicated ASICs, or other forms of specialized processors or circuitry designed to accomplish one or more specialized tasks. These tasks may include AI processing (including machine learning, training, inferencing, and classification operations), visual data processing, network data processing, object detection, rule analysis, or the like. These tasks also may include the specific edge computing tasks for service management and service operations discussed elsewhere in this document.

The interconnect 456 may couple the processor 452 to a sensor hub or external interface 470 that is used to connect additional devices or subsystems. The devices may include sensors 472, such as accelerometers, level sensors, flow sensors, optical light sensors, camera sensors, temperature sensors, global navigation system (e.g., GPS) sensors, pressure sensors, barometric pressure sensors, and the like. The hub or interface 470 further may be used to connect the edge computing node 450 to actuators 474, such as power switches, valve actuators, an audible sound generator, a visual warning device, and the like.

In some optional examples, various input/output (I/O) devices may be present within or connected to, the edge computing node 450. For example, a display or other output device 484 may be included to show information, such as sensor readings or actuator position. An input device 486, such as a touch screen or keypad may be included to accept input. An output device 484 may include any number of forms of audio or visual display, including simple visual outputs such as binary status indicators (e.g., light-emitting diodes (LEDs)) and multi-character visual outputs, or more complex outputs such as display screens (e.g., liquid crystal display (LCD) screens), with the output of characters, graphics, multimedia objects, and the like being generated or produced from the operation of the edge computing node 450. A display or console hardware, in the context of the present system, may be used to provide output and receive input of an edge computing system; to manage components or services of an edge computing system; identify a state of an edge computing component or service; or to conduct any other number of management or administration functions or service use cases.

A battery 476 may power the edge computing node 450, although, in examples in which the edge computing node 450 is mounted in a fixed location, it may have a power supply coupled to an electrical grid, or the battery may be used as a backup or for temporary capabilities. The battery 476 may be a lithium ion battery, or a metal-air battery, such as a zinc-air battery, an aluminum-air battery, a lithium-air battery, and the like.

A battery monitor/charger 478 may be included in the edge computing node 450 to track the state of charge (SoCh) of the battery 476, if included. The battery monitor/charger 478 may be used to monitor other parameters of the battery 476 to provide failure predictions, such as the state of health (SoH) and the state of function (SoF) of the battery 476. The battery monitor/charger 478 may include a battery monitoring integrated circuit, such as an LTC4020 or an LTC2990 from Linear Technologies, an ADT7488A from ON Semiconductor of Phoenix Arizona, or an IC from the UCD90xxx family from Texas Instruments of Dallas, TX. The battery monitor/charger 478 may communicate the information on the battery 476 to the processor 452 over the interconnect 456. The battery monitor/charger 478 may also include an analog-to-digital (ADC) converter that enables the processor 452 to directly monitor the voltage of the battery 476 or the current flow from the battery 476. The battery parameters may be used to determine actions that the edge computing node 450 may perform, such as transmission frequency, mesh network operation, sensing frequency, and the like.

A power block 480, or other power supply coupled to a grid, may be coupled with the battery monitor/charger 478 to charge the battery 476. In some examples, the power block 480 may be replaced with a wireless power receiver to obtain the power wirelessly, for example, through a loop antenna in the edge computing node 450. A wireless battery charging circuit, such as an LTC4020 chip from Linear Technologies of Milpitas, California, among others, may be included in the battery monitor/charger 478. The specific charging circuits may be selected based on the size of the battery 476, and thus, the current required. The charging may be performed using the Airfuel standard promulgated by the Airfuel Alliance, the Qi wireless charging standard promulgated by the Wireless Power Consortium, or the Rezence charging standard, promulgated by the Alliance for Wireless Power, among others.

The storage 458 may include instructions 482 in the form of software, firmware, or hardware commands to implement the techniques described herein. Although such instructions 482 are shown as code blocks included in the memory 454 and the storage 458, it may be understood that any of the code blocks may be replaced with hardwired circuits, for example, built into an application specific integrated circuit (ASIC).

In an example, the instructions 482 provided via the memory 454, the storage 458, or the processor 452 may be embodied as a non-transitory, machine-readable medium 460 including code to direct the processor 452 to perform electronic operations in the edge computing node 450. The processor 452 may access the non-transitory, machine-readable medium 460 over the interconnect 456. For instance, the non-transitory, machine-readable medium 460 may be embodied by devices described for the storage 458 or may include specific storage units such as optical disks, flash drives, or any number of other hardware devices. The non-transitory, machine-readable medium 460 may include instructions to direct the processor 452 to perform a specific sequence or flow of actions, for example, as described with respect to the flowchart(s) and block diagram(s) of operations and functionality depicted above. As used herein, the terms "machine-readable medium" and "computer-readable medium" are interchangeable.

Also, in a specific example, the instructions 482 on the processor 452 (separately, or in combination with the instructions 482 of the machine readable medium 460) may configure execution or operation of a trusted execution environment (TEE) 490. In an example, the TEE 490 operates as a protected area accessible to the processor 452 for secure execution of instructions and secure access to data. Various implementations of the TEE 490, and an accompanying secure area in the processor 452 or the memory 454 may be provided, for instance, through use of Intel® Software Guard Extensions (SGX) or ARM® TrustZone® hardware security extensions, Intel® Management Engine (ME), or Intel® Converged Security Manageability Engine (CSME). Other aspects of security hardening, hardware roots-of-trust, and trusted or protected operations may be implemented in the node 450 through the TEE 490 and the processor 452.

Network interface cards (NICs), also referred to as network interface devices (NID), facilitate the transmission of frames between the network and the host's operating system (OS). Transmitting and receiving frames happens with a series of operations between the host CPU and the NIC. Typically, the host OS maintains buffers for frame headers and data. Each buffer has a corresponding buffer descriptor that indicates the size of the buffer and where in host memory the buffer resides. Buffer descriptors are used to communicate between the OS and the NIC. When the OS wants to send a packet, it loads a buffer descriptor and the NIC will fetch and process the descriptor. The OS may indicate that free buffers are available and the NIC can then write received frames into the buffers and send back completed buffer descriptors that indicate the size of the received frames. Communication between the NIC and OS is performed with direct memory address (DMA).

Modern networking stateful protocols normally have three phases: 1) an initial connection handshake phase, 2) a data transfer phase, and 3) a teardown connection phase. In the Transmission Control Protocol (TCP), the initial connection handshake is performed using a SYN packet, a sliding window is used during the data transfer phase, and a FIN or RST packet is sent to terminate and teardown the connection.

A SYN packet is used to synchronize sequence numbers between sender and receiver. The sequence numbers are used to order the packets. A SYN bit in the header of a packet is set to 1 in the first packet of a packet stream. When the SYN bit is set, the sequence number field holds the initial sequence number.

Consequently, in a specific sample period, an increase SYN packets in the time window typically indicates that more connections will need to be processed in near future. This will require more power or processing frequency.

During a connection, TCP uses a sliding window flow control protocol. In each TCP segment, the receiver specifies in the receive window field the amount of additionally received data (in bytes) that it is willing to buffer for the connection. The sending host can send only up to that amount of data before it must wait for an acknowledgement (ACK) from the receiver and a window update from the receiving host. Thus, if the sliding window is increased during a connection, more traffic is expected, and the resulting workload will probably require more processing power.

A Transport Layer Security (TLS) packet is used in an encrypted connection. The overhead of decrypting data will increase the amount of power needed to process the workload. As such, observing TLS packets during a sample period will typically require more processing power.

A FIN packet is used to initiate a connection teardown. The connection termination phase uses a four-way handshake, with each side of the connection terminating independently. When an endpoint wishes to stop its half of the connection, it transmits a FIN packet, which the other end acknowledges with an ACK. Therefore, a typical teardown requires a pair of FIN and ACK segments from each TCP endpoint. A RST packet is used to terminate the connection without waiting for the other endpoint to acknowledge. A RST can be used to abort a connection that is only partially formed or that is being rejected.

As such, an increase or a large number of FIN/RST packets in a sample period probably indicates a decrease in connections and consequently, a reduction in work needing to be performed by the processor in the near future.

A power hint can be calculated using the amount of SYN packets, the amount of FIN/RST packets, the sliding window size, and the amount of TLS packets, during a sample period. The power hint is transmitted to the processor and the processor may adjust its level of power consumption.

Many forms of modern CPUs provide an automatic throttling technology that may increase or decrease processor frequencies (dynamic frequency scaling), or increase or decrease processor voltage (dynamic voltage scaling), based on workload or other factors (e.g., heat). Often, increasing frequency (clock speed) requires increasing voltage and vice versa. Examples of processor performance mechanisms include Turbo Boost and Speed Shift by Intel, Corp. and Cool'n'Quiet by Advanced Micro Devices, Inc., among others.

An example of the equation used to calculate the power hint P is provided below in Equations 1 and 2. Based on the factors listed above, in an initial sample period, the power hint is given as:

$$P = f(a,b,c,d) \qquad \text{Eq. 1}$$

Where:

a: amount of SYN packets at specific time window;

b: amount of FIN/RST packets at specific time window;

c: average slide window size of specific time window; and d: amount of TLS packets at specific time window.

The power hint and resulting processor power needed is increased when SYN packets increase, the slide window increases, or TLS packets (e.g., encryption) exists. The power hint and resulting processing power needed is decreased when connections are closed (FIN/RST packets).

For the subsequent sample periods, the power hint change is given as:

$$P_A = f((a+\Delta a),(b+\Delta b),(c+\Delta c),(d+\Delta d)) - P \qquad \text{Eq. 2}$$

Where:

Δa: the change of SYN packets compared to previous window;

Δb: the change of FIN/RST packets compare to previous window;

Δc: the change of average sliding window size compared to previous window; and

Δd: the change of TLS packets compared to previous window.

The design of function $f$ can be different based on different application needs or power budgets.

An example of function $f$ provided in pseudocode is:

```
#define SYN_FACTOR S
#define FIN_RST_FACTOR F
#define SLIDING_WINDOW_SIZE_FACTOR W
#define TLS_PKT_FACTOR T
Function f (a, b, c, d)
{
  return a * S – b * F + c * W + d * T;
}
```

The factors S, F, W, and T are constant values to determine the weight of each factor. For example, TLS packets (d and Δd) involve larger power consumption than the rest of the factors, hence T may be set to have a larger effect than the rest of the factors.

The parameters (a, b, c, d) correspond to the number of SYN packets, the number of FIN/RST packets, the average sliding window size, and the number of TLS packets, respectively. In the first function call, the parameters are the baseline values. In subsequent function calls, the parameters are adjusted based on the difference from the previous sample window.

As can be observed in the function, the power hint is increased when the number of SYN packets increase (more connections), the number of TLS packets are received (use of encryption), or the sliding window increases (more data to process). The power hint is decreased corresponding to the number of FIN/RST packets.

After $P_A$ is computed, the decision to adjust CPU power consumption is decided by another factor, processor capability. Since different processors have different power budgets and thresholds, the more powerful processor may apply smaller power consumption change than the less powerful ones, and vice versa. The power adjustment results for specific $P_A$ is controlled by the processor capability and can be predefined by the processor manufacturer by performing in-house performance benchmarking.

Figure 5:
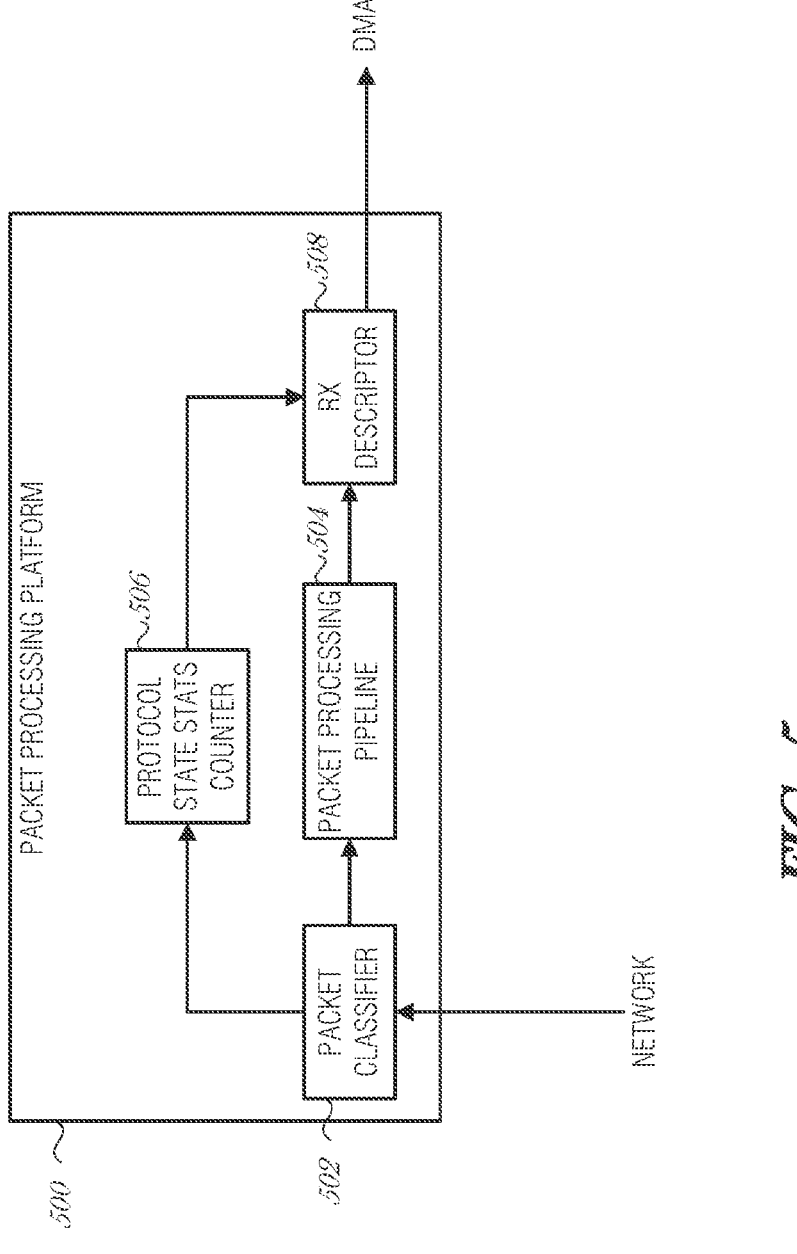
FIG. 5 is a block diagram illustrating a packet processing platform 500, according to an embodiment.

FIG. 5 is a block diagram illustrating a packet processing platform 500, according to an embodiment. The packet processing platform 500 may be incorporated on a network interface card (NIC) or network interface device (NID). The NIC may be any type of NIC, including FPGA-based smart NICs that are capable of providing application accelerators for network function virtualization (NFV) workloads, cyber security workloads, or mobile network workloads. NFV workloads may include vBNG (Virtual Broadband Network Gateway): H-QoS (Hierarchical Quality of Service), classification, policing, scheduling, shaping, and VPP (Vector Packet Processing). Such smart NICs may have one or more processors to control operation, such as a Xeon® SoC, multiple network ports, a host interface (e.g., PCIe interface), and local memory (e.g., DDR4 working memory and non-volatile flash storage).

When packets arrive at the packet processing platform 500, packet classifier circuitry 502 analyzes the L2 headers and steers the packet flow. A conventional packet processing pipeline 504 further processes the packet.

A protocol state stats counter circuitry 506 analyzes incoming packets and tracks the number of SYN packets, TLS packets, FIN/RST packets, and sliding window size. Using a function, such as those illustrated in Equations 1 and 2, the protocol state stats counter circuitry 506 computes a power hint, P. The power hint is written to a receive (Rx) descriptor 508, which is communicated to the CPU via DMA.

Figure 6:
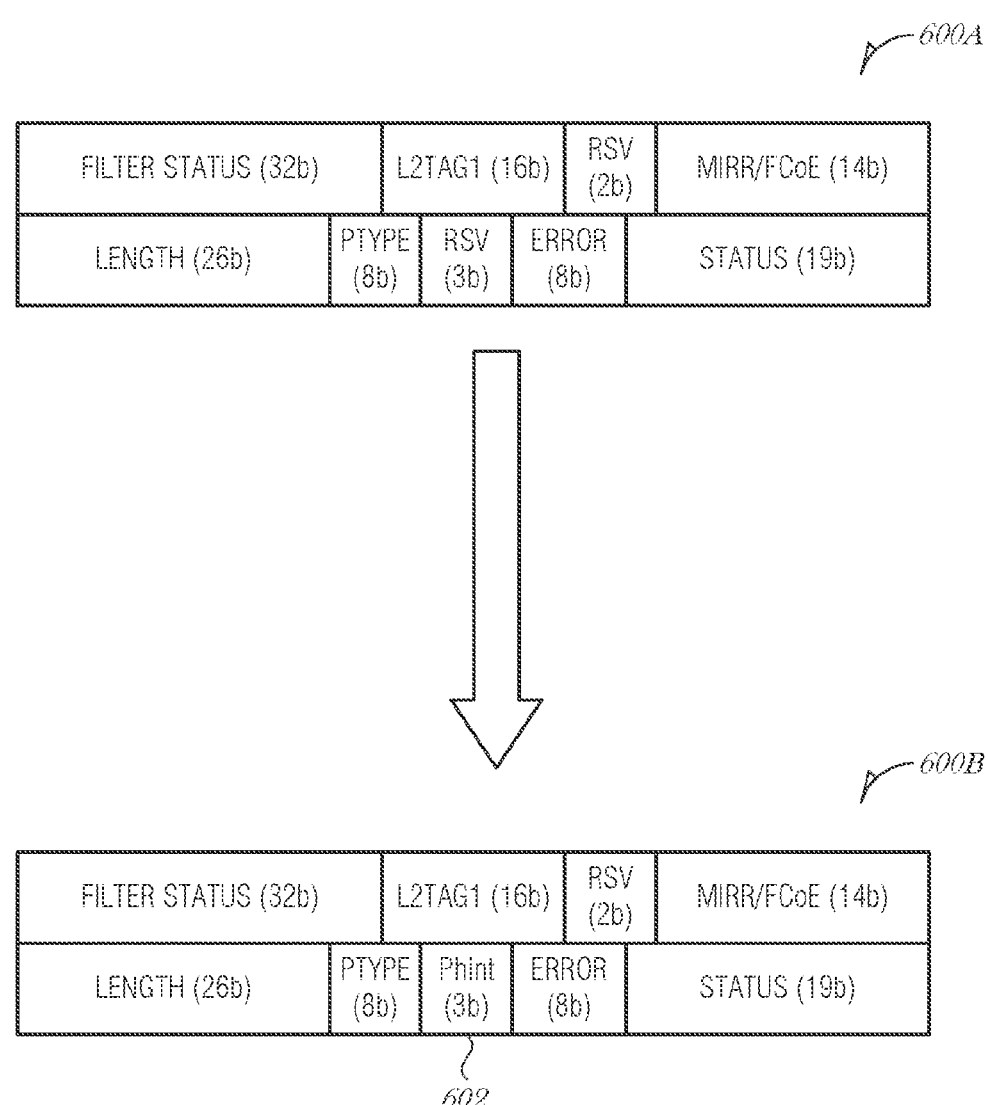
FIG. 6 is a diagram illustrating a receive (Rx) modifier descriptor data structure, according to an embodiment.

FIG. 6 is a diagram illustrating a receive (Rx) modifier descriptor data structure 600A, according to an embodiment. The descriptor illustrated in FIG. 6 is in a 16-byte receive descriptor write back format. It is understood that other receive descriptors and descriptor formats may be used, such as a 32-byte receive descriptor.

The Rx modifier descriptor data structure 600A includes a 32-bit filter status field, a 16-bit L2TAG1 (L2 VLAN tag) field, a 3-bit reserved field, a 14-bit MIRR/FCoE (Fibre Channel over Ethernet) field, a 26-bit length field, an 8-bit PTYPE (packet type) field, another reserved 3-bit field that is re-used as the Phint (power hint) 602, an 8-bit error field, and a 16-bit status field. Specifically, the Phint is stored in a field that was reserved for a future use.

The Rx modifier descriptor data structure 600B includes a Phint field 602 to store the power hint. In the data structure illustrated in FIG. 6, the Phint field 602 is 3 bits. It is understood that more or fewer bits may be used to store the power hint. Using more bits allows for finer gradation of CPU control.

With three bits, when the Phint field 602 is $000_2$, the power hint is disabled. This may be a default value of the Phint field 602. Other values in the range $001_2$ to $111_2$ may be used to indicate a scaled level of CPU frequency or power consumption for the CPU to use in anticipation of work from future network traffic. The range may be defined with $001_2$ as the lowest value and $111_2$ as the highest value.

In some embodiments, the packet processing platform 500 is configured to direct certain flows to specific queues, with each queue being serviced by a specific processor core. A core may handle n queues, wherein n>=1. At the application level, a mapping between queues and cores is maintained. Each queue's packet processing would account for 1/n power consumption of its core. So, in the process of scaling each core's power management, a weighted average of the power hint based on the number of queues that each core is servicing, may be used.

Figure 7:
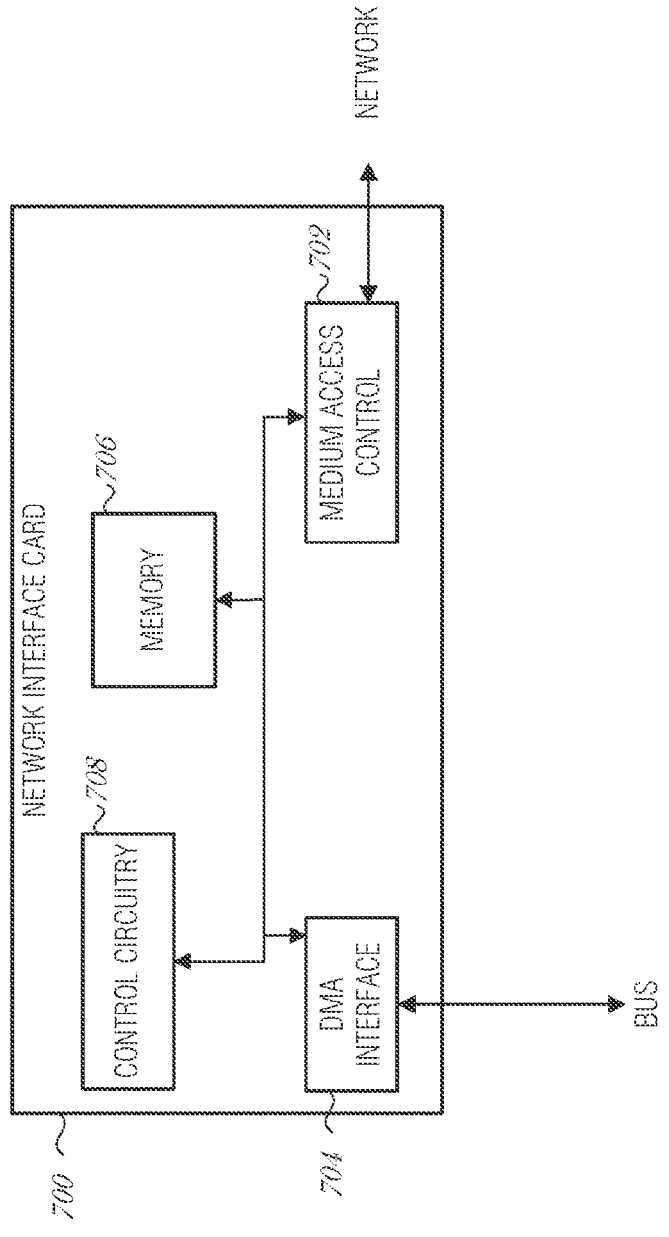
FIG. 7 is a block diagram illustrating a network interface card (MC), according to an embodiment.

FIG. 7 is a block diagram illustrating a network interface card (MC) 700, according to an embodiment. The NIC 700 includes a medium access control (MAC) unit 702, a DMA interface 704, memory 706, and control circuitry 708.

The MAC unit 702 includes circuitry that interfaces with the control circuitry 708 to receive frames over a data link layer and store them in host buffer storage, and to send frames from host buffer storage out onto the network. The data link layer may be Ethernet, Wi-Fi, Digital Subscriber Line (DSL), Integrated Services Digital Network (ISDN), or the like. The DMA interface 704 is directed by the control circuitry 708 to read and write data between the local NIC memory 706 and the host's memory (not shown). This may be performed over a bus interface, such as a Peripheral Component Interconnect (PCI) bus, a PCI Express (PCIe) bus, or the like. The memory 706 is used for temporary storage of frames, buffer descriptors, and other control data. The control circuitry 708 may include one or more programmable processors (e.g., FPGA) that execute firmware.

The control circuitry 708 may be designed, programmed, adapted, or otherwise configured to analyze incoming packet headers, calculate a power hint, and write the power hint to a descriptor, which is communicated to a host CPU or OS. Previous calculated power hints may be stored in memory 706 and used in later calculations to derive power hints. The CPU processing power may be increased or decreased based on the Phint field in the descriptor.

Figure 8:
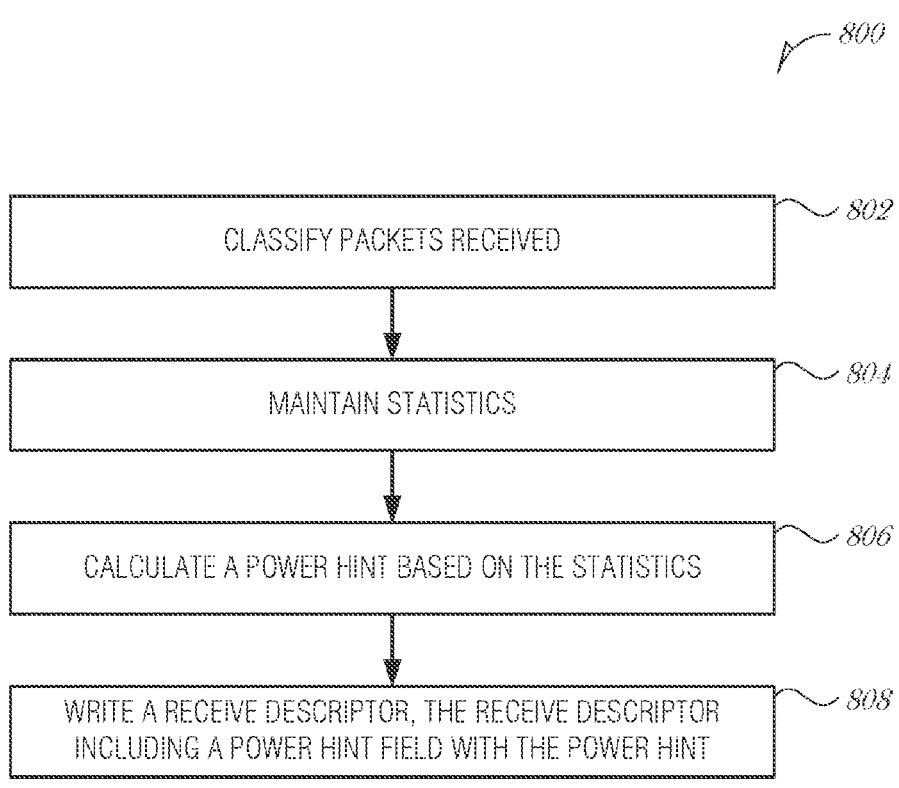
FIG. 8 is a flowchart illustrating a method for protocol state aware power management, according to an embodiment.

FIG. 8 is a flowchart illustrating a method 800 for protocol state aware power management, according to an embodiment. At 802, packets received at a medium access control (MAC) circuitry are classified as packets used to open network connections or packets used to close network connections. In an embodiment, the MAC circuitry is configured to support an Ethernet protocol.

At 804, statistics of packets used to open network connections and packets used to close network connections are maintained.

In an embodiment, the method 800 includes classifying packets received at the MAC circuitry as packets that include encrypted data and maintaining statistics of packets with encrypted data. In such an embodiment, the power hint is based in part on the statistics of packets with encrypted data.

In an embodiment, maintaining statistics includes maintaining statistics of a window size used during receiving packets, wherein the power hint is based in part on the statistics of the window size.

At 806, a power hint is calculated based on the statistics of packets used to open connections and packets used to close network connections. In an embodiment, to calculate the power hint, the control circuitry is to use to a weighted formula.

At 808, a receive descriptor is written to a host memory using a direct memory access interface, the receive descriptor including a power hint field with the power hint, the power hint used by a host processor to scale processor power based on the power hint. In an embodiment, the receive descriptor is a 16-byte write back descriptor. In an embodiment, the power hint field is a 3-bit field.

In an embodiment, the direct memory access interface includes a peripheral component interconnect (PCI) controller.

In an embodiment, to scale processor power, the host processor is to adjust a processor frequency based on the power hint. In an embodiment, to scale processor power, the host processor is to adjust a processor voltage based on the power hint.

Embodiments may be implemented in one or a combination of hardware, firmware, and software. Embodiments may also be implemented as instructions stored on a machine-readable storage device, which may be read and executed by at least one processor to perform the operations described herein. A machine-readable storage device may include any non-transitory mechanism for storing information in a form readable by a machine (e.g., a computer). For example, a machine-readable storage device may include read-only memory (ROM), random-access memory (RAM), magnetic disk storage media, optical storage media, flash-memory devices, and other storage devices and media.

Examples, as described herein, may include, or may operate on, logic or a number of components, such as modules, intellectual property (IP) blocks or cores, or mechanisms. Such logic or components may be hardware, software, or firmware communicatively coupled to one or more processors in order to carry out the operations described herein. Logic or components may be hardware modules (e.g., IP block), and as such may be considered tangible entities capable of performing specified operations and may be configured or arranged in a certain manner. In an example, circuits may be arranged (e.g., internally or with respect to external entities such as other circuits) in a specified manner as an IP block, IP core, system-on-chip (SoC), or the like.

In an example, the whole or part of one or more computer systems (e.g., a standalone, client or server computer system) or one or more hardware processors may be configured by firmware or software (e.g., instructions, an application portion, or an application) as a module that operates to perform specified operations. In an example, the software may reside on a machine-readable medium. In an example, the software, when executed by the underlying hardware of the module, causes the hardware to perform the specified operations. Accordingly, the term hardware module is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein.

Considering examples in which modules are temporarily configured, each of the modules need not be instantiated at any one moment in time. For example, where the modules comprise a general-purpose hardware processor configured using software; the general-purpose hardware processor may be configured as respective different modules at different times. Software may accordingly configure a hardware processor, for example, to constitute a particular module at one instance of time and to constitute a different module at a different instance of time. Modules may also be software or firmware modules, which operate to perform the methodologies described herein.

An IP block (also referred to as an IP core) is a reusable unit of logic, cell, or integrated circuit. An IP block may be used as a part of a field programmable gate array (FPGA), application-specific integrated circuit (ASIC), programmable logic device (PLD), system on a chip (SoC), or the like. It may be configured for a particular purpose, such as digital signal processing or image processing. Example IP cores include central processing unit (CPU) cores, integrated graphics, security, input/output (I/O) control, system agent, graphics processing unit (GPU), artificial intelligence, neural processors, image processing unit, communication interfaces, memory controller, peripheral device control, platform controller hub, or the like.

Figure 9:
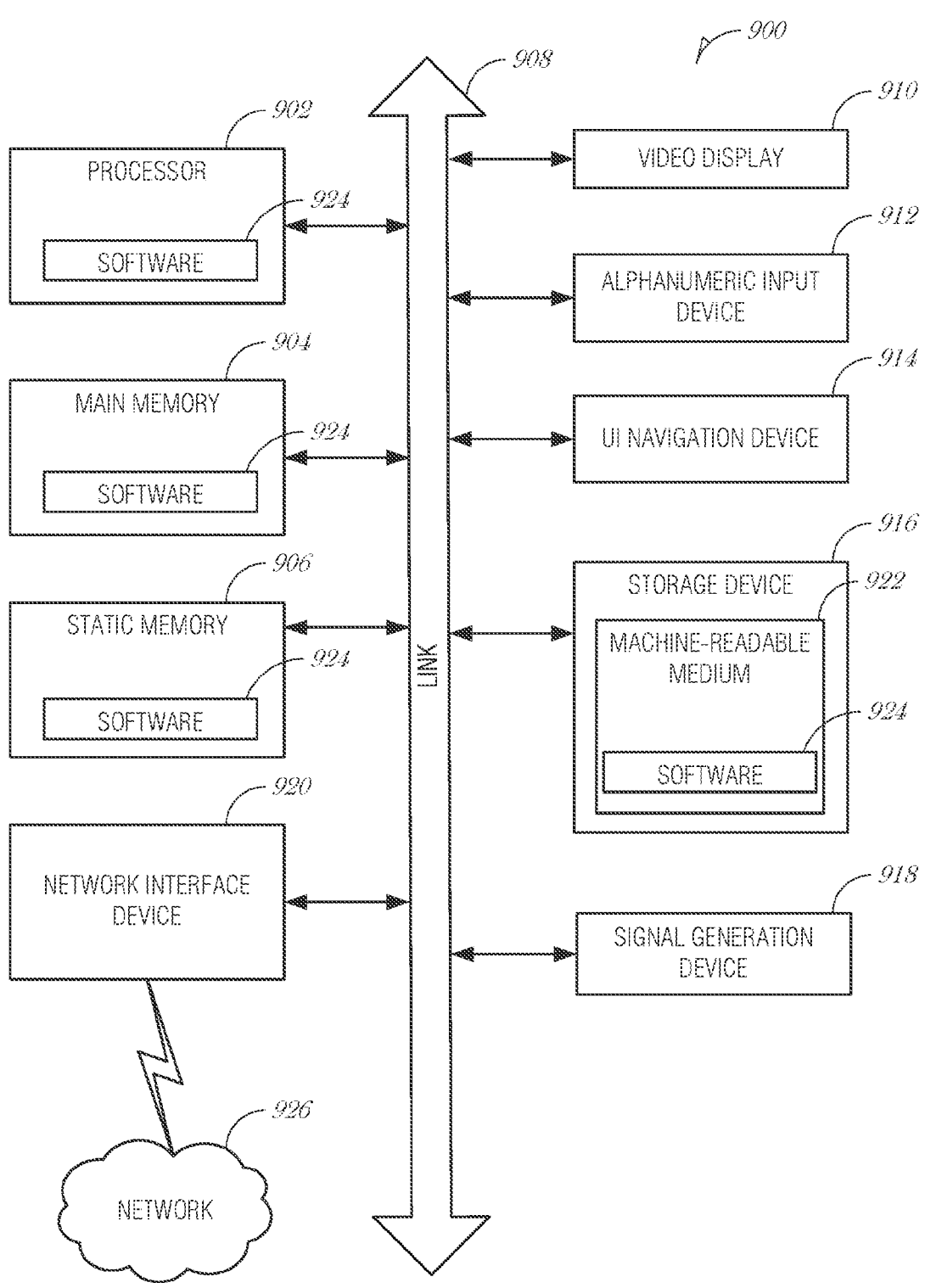
FIG. 9 is a block diagram illustrating an example machine upon which any one or more of the techniques (e.g., methodologies) discussed herein may perform, according to an example embodiment.

FIG. 9 is a block diagram illustrating a machine in the example form of a computer system 900, within which a set or sequence of instructions may be executed to cause the machine to perform any one of the methodologies discussed herein, according to an example embodiment. In alternative embodiments, the machine operates as a standalone device or may be connected (e.g., networked) to other machines. In a networked deployment, the machine may operate in the capacity of either a server or a client machine in server-client network environments, or it may act as a peer machine in peer-to-peer (or distributed) network environments. The machine may be an onboard vehicle system, set-top box, wearable device, personal computer (PC), a tablet PC, a hybrid tablet, a personal digital assistant (PDA), a mobile telephone, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein. Similarly, the term "processor-based system" shall be taken to include any set of one or more machines that are controlled by or operated by a processor (e.g., a computer) to individually or jointly execute instructions to perform any one or more of the methodologies discussed herein.

Example computer system 900 includes at least one processor 902 (e.g., a central processing unit (CPU), a graphics processing unit (GPU) or both, processor cores, compute nodes, etc.), a main memory 904 and a static memory 906, which communicate with each other via a link 908 (e.g., bus). The computer system 900 may further include a video display unit 910, an alphanumeric input device 912 (e.g., a keyboard), and a user interface (UI) navigation device 914 (e.g., a mouse). In one embodiment, the video display unit 910, input device 912 and UI navigation device 914 are incorporated into a touch screen display. The computer system 900 may additionally include a storage device 916 (e.g., a drive unit), a signal generation device 918 (e.g., a speaker), a network interface device 920, and one or more sensors (not shown), such as a global positioning system (GPS) sensor, compass, accelerometer, or other sensor.

The storage device 916 includes a machine-readable medium 922 on which is stored one or more sets of data structures and instructions 924 (e.g., software) embodying or utilized by any one or more of the methodologies or functions described herein. The instructions 924 may also reside, completely or at least partially, within the main memory 904, static memory 906, and/or within the processor 902 during execution thereof by the computer system 900, with the main memory 904, static memory 906, and the processor 902 also constituting machine-readable media.

While the machine-readable medium 922 is illustrated in an example embodiment to be a single medium, the term "machine-readable medium" may include a single medium or multiple media (e.g., a centralized or distributed database, and/or associated caches and servers) that store the one or more instructions 924. The term "machine-readable medium" shall also be taken to include any tangible medium that is capable of storing, encoding or carrying instructions for execution by the machine and that cause the machine to perform any one or more of the methodologies of the present disclosure or that is capable of storing, encoding or carrying data structures utilized by or associated with such instructions. The term "machine-readable medium" shall accordingly be taken to include, but not be limited to, solid-state memories, and optical and magnetic media. Specific examples of machine-readable media include non-volatile memory, including but not limited to, by way of example, semiconductor memory devices (e.g., electrically programmable read-only memory (EPROM), electrically erasable programmable read-only memory (EEPROM)) and flash memory devices; magnetic disks such as internal hard disks and removable disks; magneto-optical disks; and CD-ROM and DVD-ROM disks.

The instructions 924 may further be transmitted or received over a communications network 926 using a transmission medium via the network interface device 920 utilizing any one of a number of well-known transfer protocols (e.g., HTTP). Examples of communication networks include a local area network (LAN), a wide area network (WAN), the Internet, mobile telephone networks, plain old telephone (POTS) networks, and wireless data networks (e.g., Wi-Fi, 3G, and 4G LTE/LTE-A or WiMAX networks). The term "transmission medium" shall be taken to include any intangible medium that is capable of storing, encoding, or carrying instructions for execution by the machine, and includes digital or analog communications signals or other intangible medium to facilitate communication of such software.

Additional Notes & Examples

Example 1 is a network interface device for implementing protocol state aware power management, comprising: circuitry to provide a direct memory access interface; medium access control (MAC) circuitry to interface with a network; and control circuitry to: classify packets received at the MAC circuitry as packets used to open network connections or packets used to close network connections; maintain statistics of packets used to open network connections and packets used to close network connections; calculate a power hint based on the statistics of packets used to open connections and packets used to close network connections; and write a receive descriptor to a host memory using the direct memory access interface, the receive descriptor including a power hint field with the power hint, the power hint used by a host processor to scale processor power based on the power hint.

In Example 2, the subject matter of Example 1 includes, wherein to calculate the power hint, the control circuitry is to use to a weighted formula.

In Example 3, the subject matter of Examples 1-2 includes, wherein the control circuitry is to: classify packets received at the MAC circuitry as packets that include encrypted data; and maintain statistics of packets with encrypted data, wherein the power hint is based in part on the statistics of packets with encrypted data.

In Example 4, the subject matter of Examples 1-3 includes, wherein the control circuitry is to maintain statistics of a window size used during receiving packets, wherein the power hint is based in part on the statistics of the window size.

In Example 5, the subject matter of Examples 1-4 includes, -byte write back descriptor.

In Example 6, the subject matter of Examples 1-5 includes, -bit field.

In Example 7, the subject matter of Examples 1-6 includes, wherein to scale processor power, the host processor is to adjust a processor frequency based on the power hint.

In Example 8, the subject matter of Examples 1-7 includes, wherein to scale processor power, the host processor is to adjust a processor voltage based on the power hint.

In Example 9, the subject matter of Examples 1-8 includes, wherein the direct memory access interface includes a peripheral component interconnect (PCI) controller.

In Example 10, the subject matter of Examples 1-9 includes, wherein the MAC circuitry is configured to support an Ethernet protocol.

Example 11 is a method for implementing protocol state aware power management in a network interface device, comprising: classifying packets received at a medium access control (MAC) circuitry as packets used to open network connections or packets used to close network connections; maintaining statistics of packets used to open network connections and packets used to close network connections; calculating a power hint based on the statistics of packets used to open connections and packets used to close network connections; and writing a receive descriptor to a host memory using a direct memory access interface, the receive descriptor including a power hint field with the power hint, the power hint used by a host processor to scale processor power based on the power hint.

In Example 12, the subject matter of Example 11 includes, wherein to calculate the power hint, the control circuitry is to use to a weighted formula.

In Example 13, the subject matter of Examples 11-12 includes, classify packets received at the MAC circuitry as packets that include encrypted data; and maintain statistics of packets with encrypted data, wherein the power hint is based in part on the statistics of packets with encrypted data.

In Example 14, the subject matter of Examples 11-13 includes, wherein maintaining statistics comprises maintaining statistics of a window size used during receiving packets, wherein the power hint is based in part on the statistics of the window size.

In Example 15, the subject matter of Examples 11-14 includes, -byte write back descriptor.

In Example 16, the subject matter of Examples 11-15 includes, -bit field.

In Example 17, the subject matter of Examples 11-16 includes, wherein to scale processor power, the host processor is to adjust a processor frequency based on the power hint.

In Example 18, the subject matter of Examples 11-17 includes, wherein to scale processor power, the host processor is to adjust a processor voltage based on the power hint.

In Example 19, the subject matter of Examples 11-18 includes, wherein the direct memory access interface includes a peripheral component interconnect (PCI) controller.

In Example 20, the subject matter of Examples 11-19 includes, wherein the MAC circuitry is configured to support an Ethernet protocol.

Example 21 is an edge computing system, comprising a plurality of edge computing nodes, the plurality of edge computing nodes configured with the biometric security methods of any of Examples 11 to 20.

Example 22 is an edge computing node, operable in an edge computing system, comprising processing circuitry configured to implement any of the methods of Examples 11 to 20.

Example 23 is an edge computing node, operable as a server in an edge computing system, configured to perform any of the methods of Examples 11 to Example 24 is an edge computing node, operable as a client in an edge computing system, configured to perform any of the methods of Examples 11 to 20.

Example 25 is an edge computing node, operable in a layer of an edge computing network as an aggregation node, network hub node, gateway node, or core data processing node, configured to perform any of the methods of Examples 11 to 20.

Example 26 is an edge computing network, comprising networking and processing components configured to provide or operate a communications network, to enable an edge computing system to implement any of the methods of Examples 11 to 20.

Example 27 is an access point, comprising networking and processing components configured to provide or operate a communications network, to enable an edge computing system to implement any of the methods of Examples 11 to 20.

Example 28 is a base station, comprising networking and processing components configured to provide or operate a communications network, to enable an edge computing system to implement any of the methods of Examples 11 to 20.

Example 29 is a road-side unit, comprising networking components configured to provide or operate a communications network, to enable an edge computing system to implement any of the methods of Examples 11 to 20.

Example 30 is an on-premise server, operable in a private communications network distinct from a public edge computing network, the server configured to enable an edge computing system to implement any of the methods of Examples 11 to 20.

Example 31 is a 3GPP 4G/LTE mobile wireless communications system, comprising networking and processing components configured with the biometric security methods of any of Examples 11 to 20.

Example 32 is a 5G network mobile wireless communications system, comprising networking and processing components configured with the biometric security methods of any of Examples 11 to 20.

Example 33 is a user equipment device, comprising networking and processing circuitry, configured to connect with an edge computing system configured to implement any of the methods of Examples 11 to 20.

Example 34 is a client computing device, comprising processing circuitry, configured to coordinate compute operations with an edge computing system, the edge computing system configured to implement any of the methods of Examples 11 to 20.

Example 35 is an edge provisioning node, operable in an edge computing system, configured to implement any of the methods of Examples 11 to 20.

Example 36 is a service orchestration node, operable in an edge computing system, configured to implement any of the methods of Examples 11 to 20.

Example 37 is an application orchestration node, operable in an edge computing system, configured to implement any of the methods of Examples 11 to 20.

Example 38 is a multi-tenant management node, operable in an edge computing system, configured to implement any of the methods of Examples 11 to 20.

Example 39 is an edge computing system comprising processing circuitry, the edge computing system configured to operate one or more functions and services to implement any of the methods of Examples 11 to 20.

Example 40 is networking hardware with network functions implemented thereupon, operable within an edge computing system configured with the biometric security methods of any of Examples 11 to 20.

Example 41 is acceleration hardware with acceleration functions implemented thereupon, operable in an edge computing system, the acceleration functions configured to implement any of the methods of Examples 11 to 20.

Example 42 is storage hardware with storage capabilities implemented thereupon, operable in an edge computing system, the storage hardware configured to implement any of the methods of Examples 11 to 20.

Example 43 is computation hardware with compute capabilities implemented thereupon, operable in an edge computing system, the computation hardware configured to implement any of the methods of Examples 11 to 20.

Example 44 is an edge computing system adapted for supporting vehicle-to-vehicle (V2V), vehicle-to-everything (V2X), or vehicle-to-infrastructure (V2I) scenarios, configured to implement any of the methods of Examples 11 to 20.

Example 45 is an edge computing system adapted for operating according to one or more European Telecommunications Standards Institute (ETSI) Multi-Access Edge Computing (MEC) specifications, the edge computing system configured to implement any of the methods of Examples 11 to 20.

Example 46 is an edge computing system adapted for operating one or more multi-access edge computing (MEC) components, the MEC components provided from one or more of: a MEC proxy, a MEC application orchestrator, a MEC application, a MEC platform, or a MEC service, according to an European Telecommunications Standards Institute (ETSI) Multi-Access Edge Computing (MEC) configuration, the MEC components configured to implement any of the methods of Examples 11 to 20.

Example 47 is an edge computing system configured as an edge mesh, provided with a microservice cluster, a microservice cluster with sidecars, or linked microservice clusters with sidecars, configured to implement any of the methods of Examples 11 to 20.

Example 48 is an edge computing system, comprising circuitry configured to implement one or more isolation environments provided among dedicated hardware, virtual machines, containers, virtual machines on containers, configured to implement any of the methods of Examples 11 to 20.

Example 49 is an edge computing server, configured for operation as an enterprise server, roadside server, street cabinet server, or telecommunications server, configured to implement any of the methods of Examples 11 to 20.

Example 50 is an edge computing system configured to implement any of the methods of Examples 11 to 20 with use cases provided from one or more of: compute offload, data caching, video processing, network function virtualization, radio access network management, augmented reality, virtual reality, autonomous driving, vehicle assistance, vehicle communications, industrial automation, retail services, manufacturing operations, smart buildings, energy management, internet of things operations, object detection, speech recognition, healthcare applications, gaming applications, or accelerated content processing.

Example 51 is an edge computing system, comprising computing nodes operated by multiple owners at different geographic locations, configured to implement any of the methods of Examples 11 to 20.

Example 52 is a cloud computing system, comprising data servers operating respective cloud services, the respective cloud services configured to coordinate with an edge computing system to implement any of the methods of Examples 11 to 20.

Example 53 is a server, comprising hardware to operate cloudlet, edgelet, or applet services, the services configured to coordinate with an edge computing system to implement any of the methods of Examples 11 to 20.

Example 54 is an edge node in an edge computing system, comprising one or more devices with at least one processor and memory to implement any of the methods of Examples 11 to 20.

Example 55 is an edge node in an edge computing system, the edge node operating one or more services provided from among: a management console service, a telemetry service, a provisioning service, an application or service orchestration service, a virtual machine service, a container service, a function deployment service, or a compute deployment service, or an acceleration management service, the one or more services configured to implement any of the methods of Examples 11 to 20.

Example 56 is a set of distributed edge nodes, distributed among a network layer of an edge computing system, the network layer comprising a close edge, local edge, enterprise edge, on-premise edge, near edge, middle, edge, or far edge network layer, configured to implement any of the methods of Examples 11 to 20.

Example 57 is an apparatus of an edge computing system comprising: one or more processors and one or more computer-readable media comprising instructions that, when executed by the one or more processors, cause the one or more processors to perform any of the methods of Examples 11 to 20.

Example 58 is one or more computer-readable storage media comprising instructions to cause an electronic device of an edge computing system, upon execution of the instructions by one or more processors of the electronic device, to perform any of the methods of Examples 11 to 20.

Example 59 is a communication signal communicated in an edge computing system, to perform any of the methods of Examples 11 to 20.

Example 60 is a data structure communicated in an edge computing system, the data structure comprising a datagram, packet, frame, segment, protocol data unit (PDU), or message, to perform any of the methods of Examples 11 to 20.

Example 61 is a signal communicated in an edge computing system, the signal encoded with a datagram, packet, frame, segment, protocol data unit (PDU), message, or data to perform any of the methods of Examples 11 to 20.

Example 62 is an electromagnetic signal communicated in an edge computing system, the electromagnetic signal carrying computer-readable instructions, wherein execution of the computer-readable instructions by one or more processors causes the one or more processors to perform any of the methods of Examples 11 to 20.

Example 63 is a computer program used in an edge computing system, the computer program comprising instructions, wherein execution of the program by a processing element in the edge computing system is to cause the processing element to perform any of the methods of Examples 11 to 20.

Example 64 is an apparatus of an edge computing system comprising means to perform any of the methods of Examples 11 to 20.

Example 65 is an apparatus of an edge computing system comprising logic, modules, or circuitry to perform any of the methods of Examples 11 to 20.

Example 66 is at least one machine-readable medium including instructions for implementing protocol state aware power management in a network interface device, which when executed by a network interface device, cause the network interface device to perform operations comprising: classifying packets received at a medium access control (MAC) circuitry as packets used to open network connections or packets used to close network connections; maintaining statistics of packets used to open network connections and packets used to close network connections; calculating a power hint based on the statistics of packets used to open connections and packets used to close network connections; and writing a receive descriptor to a host memory using a direct memory access interface, the receive descriptor including a power hint field with the power hint, the power hint used by a host processor to scale processor power based on the power hint.

In Example 67, the subject matter of Example 66 includes, wherein to calculate the power hint, the control circuitry is to use to a weighted formula.

In Example 68, the subject matter of Examples 66-67 includes, wherein the control circuitry is to: classify packets received at the MAC circuitry as packets that include encrypted data; and maintain statistics of packets with encrypted data, wherein the power hint is based in part on the statistics of packets with encrypted data.

In Example 69, the subject matter of Examples 66-68 includes, wherein the control circuitry is to maintain statistics of a window size used during receiving packets, wherein the power hint is based in part on the statistics of the window size.

In Example 70, the subject matter of Examples 66-69 includes, -byte write back descriptor.

In Example 71, the subject matter of Examples 66-70 includes, -bit field.

In Example 72, the subject matter of Examples 66-71 includes, wherein to scale processor power, the host processor is to adjust a processor frequency based on the power hint.

In Example 73, the subject matter of Examples 66-72 includes, wherein to scale processor power, the host processor is to adjust a processor voltage based on the power hint.

In Example 74, the subject matter of Examples 66-73 includes, wherein the direct memory access interface includes a peripheral component interconnect (PCI) controller.

In Example 75, the subject matter of Examples 66-74 includes, wherein the MAC circuitry is configured to support an Ethernet protocol.

Example 76 is a computing system for implementing protocol state aware power management, comprising: a host processor; and a network interface device, comprising: circuitry to provide a direct memory access interface; medium access control (MAC) circuitry to interface with a network; and control circuitry to: classify packets received at the MAC circuitry as packets used to open network connections or packets used to close network connections; maintain statistics of packets used to open network connections and packets used to close network connections; calculate a power hint based on the statistics of packets used to open connections and packets used to close network connections; and write a receive descriptor to a host memory using the direct memory access interface, the receive descriptor including a power hint field with the power hint; wherein the host processor uses the power hint to scale processor power based on the power hint.

In Example 77, the subject matter of Example 76 includes, wherein to calculate the power hint, the control circuitry is to use to a weighted formula.

In Example 78, the subject matter of Examples 76-77 includes, wherein the control circuitry is to: classify packets received at the MAC circuitry as packets that include encrypted data; and maintain statistics of packets with encrypted data, wherein the power hint is based in part on the statistics of packets with encrypted data.

In Example 79, the subject matter of Examples 76-78 includes, wherein the control circuitry is to maintain statistics of a window size used during receiving packets, wherein the power hint is based in part on the statistics of the window size.

In Example 80, the subject matter of Examples 76-79 includes, -byte write back descriptor.

In Example 81, the subject matter of Examples 76-80 includes, -bit field.

In Example 82, the subject matter of Examples 76-81 includes, wherein to scale processor power, the host processor is to adjust a processor frequency based on the power hint.

In Example 83, the subject matter of Examples 76-82 includes, wherein to scale processor power, the host processor is to adjust a processor voltage based on the power hint.

In Example 84, the subject matter of Examples 76-83 includes, wherein the direct memory access interface includes a peripheral component interconnect (PCI) controller.

In Example 85, the subject matter of Examples 76-84 includes, wherein the MAC circuitry is configured to support an Ethernet protocol.

Example 86 is an apparatus for implementing protocol state aware power management in a network interface device, comprising: means for classifying packets received at a medium access control (MAC) circuitry as packets used to open network connections or packets used to close network connections; means for maintaining statistics of packets used to open network connections and packets used to close network connections; means for calculating a power hint based on the statistics of packets used to open connections and packets used to close network connections; and means for writing a receive descriptor to a host memory using a direct memory access interface, the receive descriptor including a power hint field with the power hint, the power hint used by a host processor to scale processor power based on the power hint.

In Example 87, the subject matter of Example 86 includes, wherein to calculate the power hint, the control circuitry is to use to a weighted formula.

In Example 88, the subject matter of Examples 86-87 includes, means for classifying packets received at the MAC circuitry as packets that include encrypted data; and means for maintaining statistics of packets with encrypted data, wherein the power hint is based in part on the statistics of packets with encrypted data.

In Example 89, the subject matter of Examples 86-88 includes, wherein the means for maintaining statistics comprise means for maintaining statistics of a window size used during receiving packets, wherein the power hint is based in part on the statistics of the window size.

In Example 90, the subject matter of Examples 86-89 includes, -byte write back descriptor.

In Example 91, the subject matter of Examples 86-90 includes, -bit field.

In Example 92, the subject matter of Examples 86-91 includes, wherein to scale processor power, the host processor is to adjust a processor frequency based on the power hint.

In Example 93, the subject matter of Examples 86-92 includes, wherein to scale processor power, the host processor is to adjust a processor voltage based on the power hint.

In Example 94, the subject matter of Examples 86-93 includes, wherein the direct memory access interface includes a peripheral component interconnect (PCI) controller.

In Example 95, the subject matter of Examples 86-94 includes, wherein the MAC circuitry is configured to support an Ethernet protocol.

Example 96 is at least one machine-readable medium including instructions that, when executed by processing circuitry, cause the processing circuitry to perform operations to implement of any of Examples 1-95.

Example 97 is an apparatus comprising means to implement of any of Examples 1-95.

Example 98 is a system to implement of any of Examples 1-95.

Example 99 is a method to implement of any of Examples 1-95.

The above detailed description includes references to the accompanying drawings, which form a part of the detailed description. The drawings show, by way of illustration, specific embodiments that may be practiced. These embodiments are also referred to herein as "examples." Such examples may include elements in addition to those shown or described. However, also contemplated are examples that include the elements shown or described. Moreover, also contemplated are examples using any combination or permutation of those elements shown or described (or one or more aspects thereof), either with respect to a particular example (or one or more aspects thereof), or with respect to other examples (or one or more aspects thereof) shown or described herein.

Publications, patents, and patent documents referred to in this document are incorporated by reference herein in their entirety, as though individually incorporated by reference. In the event of inconsistent usages between this document and those documents so incorporated by reference, the usage in the incorporated reference(s) are supplementary to that of this document; for irreconcilable inconsistencies, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to suggest a numerical order for their objects.

The above description is intended to be illustrative, and not restrictive. For example, the above-described examples (or one or more aspects thereof) may be used in combination with others. Other embodiments may be used, such as by one of ordinary skill in the art upon reviewing the above description. The Abstract is to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. However, the claims may not set forth every feature disclosed herein as embodiments may feature a subset of said features. Further, embodiments may include fewer features than those disclosed in a particular example. Thus, the following claims are hereby incorporated into the Detailed Description, with a claim standing on its own as a separate embodiment. The scope of the embodiments disclosed herein is to be determined with reference to the appended claims, along with the full scope of equivalents to which such claims are entitled.

What is claimed is:

1. A network interface device for implementing protocol state aware power management, comprising:
   circuitry to provide a direct memory access interface;
   medium access control (MAC) circuitry to interface with a network; and
   control circuitry to:
   classify a first plurality of packets received at the MAC circuitry as packets used to open network connections or packets used to close the network connections;
   maintain statistics of synchronize (SYN) packets used to open the network connections and finish/reset (FIN/RST) packets used to close the network connections;
   calculate a power hint based on the statistics of packets used to open connections and packets used to close network connections, the power hint calculated from the statistics of SYN packets and FIN/RST packets, and statistics of transport layer security (TLS) packets, observed over a monitoring period; and
   write data to a host memory using the direct memory access interface, the data including a power hint field with the power hint, the power hint used by a host processor to scale processor power based on the power hint.

2. The network interface device of claim 1, wherein to calculate the power hint, the control circuitry is to use to a weighted formula.

3. The network interface device of claim 1, wherein the control circuitry is to:
   classify a second plurality of packets received at the MAC circuitry as packets that include encrypted data; and
   maintain statistics of packets with encrypted data,
   wherein the power hint is based in part on the statistics of packets with encrypted data.

4. The network interface device of claim 1, wherein the control circuitry is to maintain statistics of a window size used during receiving packets, wherein the power hint is based in part on the statistics of the window size.

5. The network interface device of claim 1, wherein the data includes a receive descriptor that is a 16-byte write back descriptor.

6. The network interface device of claim 1, wherein the power hint field is a 3-bit field.

7. The network interface device of claim 1, wherein to scale processor power, the host processor is to adjust a processor frequency based on the power hint, the processor frequency used by the host processor to process subsequent network traffic.

8. The network interface device of claim 1, wherein to scale processor power, the host processor is to adjust a processor voltage based on the power hint, the processor voltage used by the host processor to process subsequent network traffic.

9. The network interface device of claim 1, wherein to calculate the power hint, the control circuitry is to:
  assign a first weight to the statistics of SYN packets;
  assign a second weight to the statistics of FIN/RST packets;
  assign a third weight to the statistics of TLS packets; and
  combine the weighted statistics to generate a numerical power hint value.

10. The network interface device of claim 1, wherein the host processor is to use the power hint to:
  map the power hint to a target processor power state selected from a plurality of predefined power states; and
  transition to the target processor power state before processing subsequent packets received from the network interface device.

11. A method for implementing protocol state aware power management in a network interface device, comprising:
  classifying a first plurality of packets received at a medium access control (MAC) circuitry as packets used to open network connections or packets used to close the network connections;
  maintaining statistics of synchronize (SYN) packets used to open the network connections and finish/reset (FIN/RST) packets used to close the network connections;
  calculating a power hint based on the statistics of packets used to open connections and packets used to close network connections, the power hint calculated from the statistics of SYN packets and FIN/RST packets, and statistics of transport layer security (TLS) packets, observed over a monitoring period; and
  writing data to a host memory using a direct memory access interface, the data including a power hint field with the power hint, the power hint used by a host processor to scale processor power based on the power hint.

12. The method of claim 11, wherein calculating the power hint comprises using a weighted formula.

13. The method of claim 11, comprising:
  classifying a second plurality of packets received at the MAC circuitry as packets that include encrypted data; and
  maintaining statistics of packets with encrypted data, wherein the power hint is based in part on the statistics of packets with encrypted data.

14. The method of claim 11, comprising maintaining statistics of a window size used during receiving packets, wherein the power hint is based in part on the statistics of the window size.

15. The method of claim 11, wherein the data includes a receive descriptor that is a 16-byte write back descriptor.

16. The method of claim 11, wherein the power hint field is a 3-bit field.

17. The method of claim 11, wherein to scale processor power, the host processor is to adjust a processor frequency based on the power hint, the processor frequency used by the host processor to process subsequent network traffic.

18. The method of claim 11, wherein to scale processor power, the host processor is to adjust a processor voltage based on the power hint, the processor voltage used by the host processor to process subsequent network traffic.

19. At least one machine-readable medium including instructions for implementing protocol state aware power management in a network interface device, which when executed by a network interface device, cause the network interface device to perform operations comprising:
  classifying a first plurality of packets received at a medium access control (MAC) circuitry as packets used to open network connections or packets used to close the network connections;
  maintaining statistics of synchronize (SYN) packets used to open the network connections and finish/reset (FIN/RST) packets used to close the network connections;
  calculating a power hint based on the statistics of packets used to open connections and packets used to close network connections, the power hint calculated from the statistics of SYN packets and FIN/RST packets, and statistics of transport layer security (TLS) packets, observed over a monitoring period; and
  writing data to a host memory using a direct memory access interface, the data including a power hint field with the power hint, the power hint used by a host processor to scale processor power based on the power hint.

20. The at least one machine-readable medium of claim 19, wherein to calculate the power hint, the instructions cause the network interface device to use to a weighted formula.

21. The at least one machine-readable medium of claim 19, wherein the instructions cause the network interface device to:
  classify a second plurality of packets received at the MAC circuitry as packets that include encrypted data; and
  maintain statistics of packets with encrypted data, wherein the power hint is based in part on the statistics of packets with encrypted data.

22. A computing system for implementing protocol state aware power management, comprising:
  a host processor; and
  a network interface device, comprising:
  circuitry to provide a direct memory access interface;
  medium access control (MAC) circuitry to interface with a network; and
  control circuitry to:
  classify a first plurality of packets received at the MAC circuitry as packets used to open network connections or packets used to close the network connections;
  maintain statistics of synchronize (SYN) packets used to open the network connections and finish/reset (FIN/RST) packets used to close the network connections;
  calculate a power hint based on the statistics of packets used to open connections and packets used to close network connections, the power hint calculated from the statistics of SYN packets and FIN/RST packets, and statistics of transport layer security (TLS) packets, observed over a monitoring period; and
  write data to a host memory using the direct memory access interface, the data including a power hint field with the power hint;

wherein the host processor uses the power hint to scale processor power based on the power hint.

23. The computing system of claim 22, wherein to calculate the power hint, the control circuitry is to use to a weighted formula.

24. The computing system of claim 22, wherein the control circuitry is to:

classify a second plurality of packets received at the MAC circuitry as packets that include encrypted data; and maintain statistics of packets with encrypted data, wherein the power hint is based in part on the statistics of packets with encrypted data.

* * * * *